(12) United States Patent
Shih

(10) Patent No.: US 7,291,575 B2
(45) Date of Patent: Nov. 6, 2007

(54) ACTIVE, HETEROGENEOUS BI- OR TRI-DENTATE CATALYST

(76) Inventor: Keng Yu Shih, 5455 Wooded Way, Columbia, MD (US) 21044

( * ) Notice: Subject to any disclaimer, the term of this patent is extended or adjusted under 35 U.S.C. 154(b) by 0 days.

(21) Appl. No.: 10/633,509

(22) Filed: Aug. 5, 2003

(65) Prior Publication Data

US 2004/0029719 A1  Feb. 12, 2004

Related U.S. Application Data

(63) Continuation of application No. 09/431,803, filed on Nov. 1, 1999, now abandoned.

(51) Int. Cl.
*B01J 31/19* (2006.01)
*B01J 31/26* (2006.01)

(52) U.S. Cl. .................. 502/158; 526/113; 556/27; 556/39; 556/51; 556/136; 556/170

(58) Field of Classification Search ............... 502/103, 502/158; 526/113; 252/183.12; 556/27, 556/39, 51, 136, 170
See application file for complete search history.

(56) References Cited

U.S. PATENT DOCUMENTS

| | | | |
|---|---|---|---|
| 4,234,453 A | 11/1980 | Rekers et al. ............... 252/428 |
| 4,375,406 A | 3/1983 | Santilli ........................ 208/251 |
| 4,629,712 A | 12/1986 | Pinnavaia et al. ............. 502/63 |
| 4,637,992 A | 1/1987 | Lewis et al. .................... 502/84 |
| 4,701,432 A | 10/1987 | Welborn, Jr. |
| 4,716,205 A | 12/1987 | Klabunde |
| 4,761,391 A | 8/1988 | Occelli ........................ 502/63 |
| 4,904,631 A | 2/1990 | Chang |
| 4,981,825 A | 1/1991 | Pinnavaia et al. ............. 502/63 |
| 4,995,964 A | 2/1991 | Gortsema et al. ........... 208/112 |
| 5,008,228 A | 4/1991 | Chang |
| 5,238,892 A | 8/1993 | Chang ......................... 502/111 |
| 5,240,894 A | 8/1993 | Burkhardt et al. |
| 5,308,811 A | 5/1994 | Suga et al. .................... 502/62 |
| 5,382,738 A | 1/1995 | Reagen et al. |
| 5,395,808 A | 3/1995 | Miller et al. ..................... 502/7 |
| 5,399,636 A | 3/1995 | Alt et al. ..................... 526/129 |
| 5,403,799 A | 4/1995 | Miller et al. ................... 502/64 |
| 5,403,809 A | 4/1995 | Miller et al. ................. 502/413 |
| 5,529,965 A | 6/1996 | Chang |
| 5,569,634 A | 10/1996 | Miller et al. ................... 502/64 |
| 5,620,938 A * | 4/1997 | Sielcken ..................... 502/152 |
| 5,629,253 A | 5/1997 | Chang |
| 5,633,419 A | 5/1997 | Spencer et al. ............. 585/522 |
| 5,637,660 A | 6/1997 | Nagy et al. |
| 5,707,913 A | 1/1998 | Schlund et al. |
| 5,753,577 A | 5/1998 | Hamura et al. ............. 502/113 |
| 5,807,800 A | 9/1998 | Shamshoum et al. ....... 502/104 |
| 5,807,938 A | 9/1998 | Kaneko et al. ............. 526/160 |
| 5,817,724 A * | 10/1998 | Aoki et al. .................. 526/127 |
| 5,830,820 A | 11/1998 | Yano et al. ................... 502/62 |
| 5,852,146 A | 12/1998 | Reichle et al. |
| 5,866,663 A | 2/1999 | Brookhart et al. .......... 526/170 |
| 5,880,241 A * | 3/1999 | Brookhart et al. .......... 526/348 |
| 5,880,323 A | 3/1999 | Brookhart, III et al. .... 585/527 |
| 5,886,224 A | 3/1999 | Brookhart et al. .......... 564/272 |
| 5,891,963 A | 4/1999 | Brookhart et al. ....... 525/326.1 |
| 5,955,555 A * | 9/1999 | Bennett ...................... 526/133 |
| 6,117,959 A * | 9/2000 | Ponasik et al. ............. 526/172 |
| 6,184,171 B1 * | 2/2001 | Shih .......................... 502/158 |
| 6,303,720 B1 * | 10/2001 | Mackenzie et al. ......... 526/172 |
| 6,365,539 B1 * | 4/2002 | Ponasik et al. ............. 502/162 |
| 6,399,535 B1 * | 6/2002 | Shih et al. .................. 502/167 |
| 6,521,561 B1 * | 2/2003 | Jacobsen et al. ............ 502/162 |
| 6,559,090 B1 * | 5/2003 | Shih et al. .................. 502/152 |
| 6,686,306 B2 * | 2/2004 | Shih .......................... 502/113 |
| 6,710,007 B2 * | 3/2004 | Brookhart et al. .......... 502/155 |

FOREIGN PATENT DOCUMENTS

WO  WO98/56832      12/1998
WO  WO9856832 A1 * 12/1998

* cited by examiner

*Primary Examiner*—David Sample
(74) *Attorney, Agent, or Firm*—Howard J. Troffkin; Robert A. Maggio

(57) ABSTRACT

A catalyst composition, and olefin polymerization process using same, formed from a mixture of a non-aluminoxane aluminum compound, an inorganic oxide and a transition metal bidentate or tridentate complex in certain prescribed proportions. The composition can be formed in a single step or in-situ in the polymerization reaction zone. The resultant catalyst has high activity and is capable of producing high molecular weight olefin products without reactor fouling.

98 Claims, No Drawings

ACTIVE, HETEROGENEOUS BI- OR TRI-DENTATE CATALYST

This is a continuation of U.S. patent application Ser. No. 09/431,803, filed Nov. 1, 1999, now abandoned.

FIELD OF THE INVENTION

The present invention relates to catalyst compositions suitable for olefinic polymerization, to methods of forming said catalyst compositions and to processes of forming polyolefinic products using the subject catalyst compositions. More particularly, the present invention is directed to a catalyst composition composed of a mixture of a non-alumoxane aluminum compound, an inorganic oxide and a bidentate or tridentate ligand/transition metal complex. The composition is formed by substantially simultaneously mixing the aluminum compound with an inorganic oxide and with the bidentate and/or tridentate ligand/transition metal complex in certain prescribed proportions, as fully described herein below. The subject catalyst compositions have unexpectedly been found to have high catalytic activity and, in the polymerization of olefinic compounds, can produce, without reactor fouling, high molecular weight products having desired granular polymer morphology.

BACKGROUND OF THE INVENTION

Ziegler-Natta and metallocene catalyst systems are well established in the prior art for their use in the polymerization of olefins. The use of Ziegler-Natta catalysts, for example, those produced by activating a titanium halide with an organometallic compound (e.g., trialkyl aluminum), are fundamental to many commercial processes for manufacturing polyolefins. In certain instances the active components of the Ziegler-Natta catalyst have been impregnated into a support, such as an inorganic oxide (e.g., silica) prior to introduction into the reaction zone (see Macromol. Symp., 1995, 89, 563).

Over the past decade, metallocene olefin polymerization catalyst systems have been developed. These systems typically use a Group IV-B metal contain compound having at least one cyclopentadienyl group coordinated to a transition metal atom as, for example cyclopentadiene and bis(cyclopentadienyl) transition metal compounds and an activator, such as an aluminoxane, or a boron or borate compound.

Metallocene catalysts can be employed either as so-called "neutral metallocenes" in which case an alumoxane, such as methylalumoxane, is used as a co-catalyst, or they can be employed as so-called "cationic metallocenes" which incorporate a stable and loosely bound non-coordinating anion as a counter ion to a cationic metal metallocene center. Cationic metallocenes are disclosed in U.S. Pat. Nos. 5,064,802; 5,225,500; 5,243,002; 5,321,106; 5,427,991; and 5,643,847; and EP 426 637 and EP 426 638.

U.S. Pat. No. 5,241,025 teaches a catalyst system having an activator component formed from a Group III-A element activator. This activator reacts with a ligand of the Group IV-B metallocene complex and an anion which is bulky and non-coordinatable with the Group IV-B transition metal cation produced. Similarly, U.S. Pat. No. 5,198,401 teaches the formation of an ionic catalyst composition using a bis(cyclopentadienyl) Group IV-B metal complex and a boron containing activator. Both of the above teachings are directed to homogeneous metallocene polyolefin catalyst systems.

Another widely used activator for metallocene catalyst systems are aluminoxanes. These compounds are olgimers or polymeric aluminum oxy compounds containing chains of alternating aluminum and oxygen atoms with alkyl groups pendent from the aluminum atoms. The aluminoxanes are normally formed by the reaction of water and an aluminum alkyl which may also contain a halo or alkoxy group, as disclosed in EP-A-338,044. The most preferred aluminoxane is methylaluminoxane (MAO). It is known that transition metal catalysts require large quantities (e.g., Al to transition metal molar ratio of about 500 or greater) of activator (e.g., aluminoxane) to achieve commercially suitable activity. Conventionally, these activators are normally separately formed and then combined with the catalyst precursor compound. Such activators are expensive and difficult to handle due to their pyrophoric properties and unstable character. Further, catalyst systems formed with these activators are difficult to effectively anchor or immobilized onto a support and, therefore, the catalyst tend to resolubilize from or leach out of the support causing fouling within the polymerization reactor.

Several patents disclose the formation of aluminoxanes from an aluminum alkyl compound and hydrated silica. U.S. Pat. No. 4,904,631 teaches the formation of an aluminoxane activator from a trialkyl aluminum with silica having 6 to 20 wt percent water. The initially formed activator is subsequently used with an early transition metal compound to provide a catalyst composition of low activity. Similarly, U.S. Pat. No. 5,008,228 forms its aluminoxane cocatalyst from an aluminum alkyl and a silica having 10 to 50 weight percent water. The formed aluminoxane is added to a metallocene compound to provide a heterogeneous catalyst for the polymerization of olefins. In U.S. Pat. No. 5,629,253, one is taught that hydrated silica should be reacted with an aluminum alkyl in an amount to have a molar ratio of metal to water of greater than 0.7 and the water content of the silica should be from about 7 to 15 weight percent to provide a desired aluminoxane which can then be combined with a metallocene compound.

The required use of aluminoxane in large quantities to provide a catalyst of suitable activity, the need to initially form the aluminoxane followed by its combining with certain catalysts compounds in a multi-step process, the sensitivity of metallocenes to commonly encountered impurities and the poor morphology of resultant polymer product are all known disadvantages of such catalyst systems.

Recently, much interest has centered on the use of late transition metal (e.g., Fe, Co, Ni or Pd) bidentate and tridentate based catalyst compositions because of their low electrophilicity and consequent improved tolerance to polar functionalities. Representative disclosers of such late transition metal catalysts are found in U.S. Pat. No. 5,880,241 and its divisional counterparts U.S. Pat. Nos. 5,880,323; 5,866,663; 5,886,224; and 5,891,963, and PCT International Application Nos. PCT/US98/00316; PCT/US97/23556; PCT/GB99/00714; PCT/GB99/00715; and PCT/GB99/00716. These metal compounds typically exhibit good activity when they are used with large amounts of aluminoxane activators to generate the cationic catalyst specie. However, the presence of large amounts of aluminoxane in such systems cause chain transfer reaction to occur and thereby predominantly produce low molecular weight oligomer products.

There are a number of factors used to evaluate a catalyst system, such as its activity, that is to say the amount of catalyst required for economic conversion of a given amount of olefin, the product conversion time and the product yield.

Further, the stability and ease of handling of catalyst components and the resultant system are other factors which effect the choice of commercial embodiments. For example, coordination catalysts are known to be extremely sensitive to moisture and air and their activity is greatly reduced or destroyed by such elements. Still further, the ability of a catalyst system, especially a coordination catalyst, to be utilized as a heterogeneous catalyst is of commercial consideration. Such systems are utilized in slurry polymerization processes where the monomer, catalyst and diluent are continuously fed into the reactor and the solid polymer product so produced is periodically withdrawn.

Thus, there has been a continuing search to develop a coordination catalyst system, preferably a heterogeneous coordination catalyst system, which demonstrates high catalyst activity, is free of reactor fouling, produces polymer products having good resin morphology while simultaneously being very process friendly (e.g., easy to make) and inexpensive to make.

There has also been a particular need to discover compounds which are less sensitive to deactivation and/or less hazardous and still suitable as activating components in coordination catalyst systems.

It would be desirable to provide heterogeneous polymerization catalyst compositions with high catalytic activity for the production of olefinic polymers and copolymers. It would be also desirable to provide such a catalyst composition of high catalytic activity which does not require the use of aluminoxane. It would be further desirable to produce said heterogeneous catalyst compositions by a single step process. It would still further be desirable to provide a process for the polymerization of olefins, such as ethylene alone or with higher olefins or functional olefins, using said heterogeneous catalyst composition.

SUMMARY OF THE INVENTION

The present invention is directed to a new and novel catalyst composition, to a process for forming said catalyst composition and to polymerization processes utilizing said catalyst composition. More specifically, the present invention is directed to a catalyst composition formed by contacting together in an inert liquid i) at least one bidentate or tridentate ligand/transition metal complex or mixtures thereof, ii) an aluminum compound, and iii) an inorganic oxide in certain ratios.

The resultant mixture provides a catalyst composition exhibiting high catalytic activity suitable to produce high molecular weight olefinic homopolymers and copolymers including copolymers having some monomeric units composed of pendant functional groups.

The present invention partly relies on the discovery that activation of a bidentate and/or tridentate ligand/transition metal complex is very sensitive to the level of aluminum compound used according to the present invention and that said activation is induced by extremely low amounts of said compound. This has the benefit of further reducing the cost of the catalyst system and eliminates the need for expensive and difficult to handle aluminoxanes or borate activators of the prior art. In addition, the present invention partly relies on the discovery that immobilization of the transition metal complex occurs by the present process without any special impregnation step and the slurry of the present invention having the activated catalyst can be used directly or formed in situ in an olefin polymerization process.

DETAILED DESCRIPTION

The present invention is directed to a catalyst composition formed of a mixture of at least one bidentate or tridentate ligand/transition metal complex or mixtures thereof, an aluminum compound and an inorganic oxide, as fully disclosed herein below. The terms "bidentate" and "tridentate", as used in this specification and the claims appended hereto, refer to compounds which are free from a cyclopentadienyl group, or a plurality of such groups, which is associated with a transition metal atom. The present catalyst composition is formed by substantially simultaneously contacting the above components at prescribed ratios in an inert liquid to produce a catalytically active mixture.

The aluminum compounds (Component I) which are useful in the present invention can be represented by the formula:

$$Al(R)_a(Q)_b(D)_c \qquad I$$

where Al represents an aluminum atom, each R independently represents a hydrocarbyl group (R) having one to twenty-four, preferably one to eight, more preferably three to five, carbon atoms as, for example, alkyl groups such as methyl, ethyl, propyl, isopropyl, butyl (all isomers), pentyl (all isomers), hexyl (all isomers), heptyl (all isomers) or octyl (all isomers); aryl such as phenyl; and alkyl substituted aryl, such as toluyl, 2,6-dimethylphenyl; and the like and mixtures thereof;

each Q independently represents a hydrocarbyloxy group —OR wherein R is as defined above and O represents an oxygen atom;

each D independently represents a hydrogen or a halogen atom such as chlorine (preferred), bromine, fluorine or iodine;

a, b and c each represent an integer of from 0 to 3 provided the sum of a+b+c is 3. The preferred aluminum compounds have at least one hydrocarbyl group ("a" has a value of at least 1), more preferably, two hydrocarbyl groups ("a" has a value of 2), and most preferably all substituents are hydrocarbyl groups ("a" has a value of 3).

Examples of such aluminum compounds includes alkyl aluminum compounds, including trialkyl aluminum compounds, such as trimethyl aluminum, triethyl aluminum, triisopropyl aluminum, triisobutyl aluminum, and the like; alkyl aluminum alkoxides [$(R)_aAl(OR)_b$] such as ethyl aluminum diethoxide, diisobutyl aluminum ethoxide, di(tert-butyl) aluminum butoxide, diisopropyl aluminum ethoxide, and the like; aluminum alkoxides [$Al(OR)_b(H)_c$] such as aluminum ethoxide, aluminum propoxide, aluminum butoxide and the like; alkyl or aryl aluminum halide [$Al(R)_a(X)_c$] such as diethyl aluminum chloride, ethyl aluminum dichloride, diisopropyl aluminum choride and the like; aluminum halides such as aluminum trichloride, aluminum dichloride and the like; aluminum aryloxides such as aluminum phenoxide, and the like; and mixed aryl, alkyl or aryloxy, alkyl aluminum compounds. The preferred aluminum compounds have at least one hydrocarbyl group (where "a" is at least 1) and more preferably all substituents are hydrocarbyl groups (where "a" is 3). Of the hydrocarbyl groups, it is preferred that each be selected from $C_1$-$C_5$ (most preferred $C_3$-$C_5$) alkyl groups.

The aluminum compound should have at least one hydrocarbyl group ("a" is a value of 1 to 3, most preferably 3), when the bidentate or tridentate ligand/transition metal complex described below used to form the present catalyst composition has at least one ligand group L selected from a halogen atom. When all of the ligand groups, L, of the transition metal complex are selected from hydrocarbyl groups, the aluminum compound used herein may, in such instance, be composed of only hydrocarbyloxy ("b" is at least one) or halogen ("c" is at least one) or both. It is most preferred that the aluminum compound be selected from aluminum trihydrocarbyl compounds and the L groups be selected from halogens.

The second component (Component II) required to form the present catalyst composition is an inorganic oxide particulate selected from silica, alumina, magnesia, titania, zirconia, chromia or aluminaphosphate or mixtures thereof with silica or alumina being preferred and silica being most preferred. The particulate should have a surface area in the range of from about 10 m²/g to about 1000 m²/g (BET nitrogen porisimetry) with from about 100 to about 800 m²/g being preferred and from about 200 to about 600 m²/g being most preferred. The pore volume of the particles may range from about 0.1 cc/g to about 3 cc/g (nitrogen absorption) with from about 0.2 to about 2 cc/g being preferred. The particle size of inorganic oxide may range from about 0.1 µ to about 200 µ.

Although the inorganic oxide is substantially free from absorbed water, it should have residual hydroxyl groups on its surface in from 0.01 to 12 mmol/g, preferably from 0.1 to 5 mmol/g and most preferably from 0.5 to 4 mmol/g. The hydroxyl functionality can be determined by the technique of Fourier Transform Infrared Spectracopy, as described by Griffiths et al 83, Chemical Analysis 544, Wiley Interscience (1986).

The inorganic oxide may have an associated volatile component such as a low boiling liquid. The total volatile of the inorganic oxide may range from about 0.1 to about 10 weight percent (the total volatile is determined by weight loss after heating a sample at a rate of 10° C./min until it attains 955° C. and then calcining at 1750° F. (955° C.) for 40 minutes). The preferred inorganic oxide is selected from silica or alumina having low total volatile content ranging from 0.1 to about 4 weight percent with from about 0.5 to about 3 weight percent being most preferred. Such low total volatile content can be achieved by calcining the inorganic oxide at elevated temperatures prior to use. It has been bound that the preferred inorganic oxides with low total volatile content provide highly active catalyst composition when utilized according to the present invention. Further, such inorganic oxides do not promote unwanted exothermic reaction with the aluminum compounds as is commonly encountered when the volatile content is high and mainly composed of water.

The aluminum compound and the silica should be introduced into the mixture in a ratio of from 0.001 mmol to 2.1 mmol of Al per gram of inorganic oxide (e.g. SiO₂ or Al₂O₃), preferably from about 0.01 to about 1.9 mmol, more preferably from 0.01 to 1.5 mmol, and most preferably form 0.01 to about 1 mmol Al per gram of inorganic oxide (e.g., SiO₂ or Al₂O₃, as appropriate).

The catalyst composition of the present invention is formed with at least one bidentate ligand/late transition metal complex or at least one tridentate ligand/late transition metal complex or a mixture of said complexes (Component III). Such complexes, as employed to form the present catalyst composition, can be viewed as a non-metallocene, non-constrained geometry neutral transition metal complex and as a pre-catalyst component of the subject application.

The bidentate ligand/transition metal complex pre-catalyst can be generically represented by the formula:

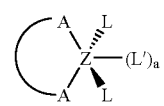

II and the tridentate ligand/transition metal complex pre-catalyst can be generically represented by the formula:

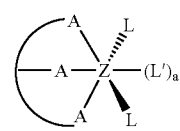

III wherein in each of formulas II and III above:

each A independently represent an at least one of oxygen, sulfur, phosphorous or nitrogen, and preferably represents oxygen or nitrogen or a combination thereof, and most preferably each A in II and at least two A's of III represent nitrogen;

"a" is an integer of 0, 1 or 2 which represents the number of (L') groups bound to Z, the value of "a" being dependent on the oxidation state of Z and whether a particular A—Z bond is dative or covalent, and if covalent whether it is a single or double bond;

Z represents at least one of Group 3 to 10 transition metals of the Periodic Table, preferably transition metals selected from Fe, Co, Ni, Ru, Rh, Pd, Os, Ir, Pt in the +2 (a=0) or +3 (a=1) oxidation state or Ti, V, Cr, Mn, Zr, Hf in the +2 (a=0), +3 (a=1) or +4 (a=2) oxidation states, more preferably a Group 4 to 7 late transition metal selected from iron, cobalt, nickel or palladium and most preferably iron or cobalt;

and each L and L' (when present) independently represents a ligand selected from the group of hydrogen, halo, and hydrocarbon based radical or group associated through a covalent or dative bond to Z, or bond L groups together represent a hydrocarbon based radical, preferably a $C_3$ to $C_{24}$ hydrocarbylene (metallocyclic) group, associated through a covalent or dative bond to Z, and which, together with Z, constitute a ring or fused ring structure, typically a 3 to 7, preferably 4 to 7 member heterocyclic ring structure when the line joining A to Z represents a covalent bond.

As used herein, the term "hydrocarbon-based radical or group" denotes a radical or group having a carbon atom directly attached to the remainder of the molecule and having a predominantly hydrocarbon character within the context of this invention. Moreover, in this context the terms "group" and "radical" are used interchangeably. Such radicals include all the following:

(1) Hydrocarbon radicals; that is, aliphatic radicals, aromatic- and alicyclic-substituted radicals, and the like, of the type known to those skilled in art.

(2) Substituted hydrocarbon radicals; that is, radicals containing pendant non-hydrocarbon substituents, that in the context of this invention, do not alter the predominantly hydrocarbon character of the radical or constitute a poison for the pre-catalyst. Those skilled in the art will be aware of suitable substituents; examples are halo, nitro, hydroxy, alkoxy, carbalkoxy, and alkythio.

(3) Hetero radicals; that is, radicals which, while predominantly hydrocarbon in character within the context of this invention, contain atoms other than carbon present as a member of the linear structure of a chain or ring otherwise composed of carbon atoms. Suitable hetero atoms will be apparent to those skilled in the art and include, for example, nitrogen, oxygen and sulfur.

In general, no more than three substituents or hetero atoms, and preferably no more than one, will be present for each 10 carbon atoms in the hydrocarbon based radical.

More specifically, the hydrocarbon based radical or group of L and L' can be substituted or unsubstituted, cyclic or non-cyclic, linear or branched, aliphatic, aromatic, or mixed aliphatic and aromatic including hydrocarbyl, hydrocarbylene, hydrocarbyloxy, hydrocarbylsilyl, hyddrocarbylamino, and hydrocarbylsiloxy radicals having up to 50 non-hydrogen atoms. The preferred L and L' groups are independently selected from halo, hydrocarbyl, and substituted hydrocarbyl radicals. More specifically, the halo group may be chloro, bromo, or fluoro with chloro being preferred. The hydrocarbon based radical may typically contain from 1 to about 24 carbon atoms, preferably from 1 to about 12 carbon atoms and the substituent group is preferably a halogen atom.

The lines joining each A to each other A represent a hydrocarbon based radical, (typically a $C_2$ to $C_{90}$ (e.g., $C_2$ to $C_{20}$) preferably $C_3$ to $C_{30}$ (e.g., $C_3$ to $C_{12}$) hydrocarbon based radical, such as a hydrocarbylene radical providing a ring or fused ring hydrocarbylene structure or substituted hydrocarbylene structure. Portions of the structure may be comprised of carbon-carbon double bonds, carbon-carbon single bonds, carbon-A atom double bonds and carbon-A atom single bonds.

Typically, for the bidentate and tridentate ligand/transition metal complexes, A, Z and the carbons includable in the lines connecting the (A) groups collectively can be joined to typically make a 4 to 7, preferably 5 to 7 member ring structures.

The bonds between each A atom of the pre-catalyst and the transition metal Z and between L and Z can be either dative or covalent. Dative bonds merely represent a relationship between an electron rich A atom and the metal Z whereby the electron density of the metal is increased by providing electrons to the empty orbitals of the metal and do not induce any change in the oxidation state of the metal Z. Similar considerations apply to the relationship between Z and L.

The above described bidentate and tridentate ligand/transition metal complex pre-catalyst from which the subject catalyst is derived are known. The disclosure of such components and the methods of forming the same have been described in various publications, including PCT Pub. Nos. WO 96/23010; WO 99/46302; WO 99/46303; and WO 99/46304; U.S. Pat. Nos. 5,880,241; 5,880,323; 5,866,663; 5,886,224; and 5,891,963; Journal of the American Chemical Society (JACS) 1998, 120, 6037-6046, JACS 1995, 117, 6414-6415 and Supplemental Teachings; JACS 1996, 118, 1518; Macromol. Rapid Commun. 19, 31-34 (1998); Caltech Highlights 1997, 65-66; Chem Week Apr. 29, 1998, 72; C&EN Apr. 13, 1998, 11-12; JACS 1998, 120, 4049-4050; Japanese Patent Application 02-078,663, and Angew. Chem. Int. Ed. 1999, vol 38, pp 428-447, The Search for New-Generation Olefin Polymerization Catalysts: Life Beyond Metallocenes. The teaching of each of the above cited references are incorporated herein in its entirety by reference.

In formulas II and III, each L and L' group is preferably a halogen atom, an unsubstituted hydrocarbyl or a hydrocarbyloxy group. The most preferred compounds are those having each L being halogen.

Preferred bidentate ligand/transition metal pre-catalyst complexes may, for example be represented as compounds of the formula:

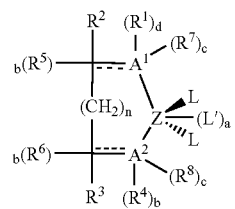

IIa wherein n is an integer which can vary from 0 to 3, preferably 0 to 1;

a, b, c, and d each independently represents a 1 to 0 to indicate whether its associated L or R group is present (1) or not (0);

$R^1$ and $R^4$ are each independently selected from an unsubstituted or substituted $C_1$-$C_{20}$, preferably $C_3$-$C_{20}$ hydrocarbyl, such as alkyl, aryl, alkaryl, or aralkyl group, as for example, i-propyl; t-butyl; 2,4,6-trimethylphenyl; 2-methylphenyl; 2,6-diisopropylphenyl; their fluorinated derivatives and the like; or with adjacent groups, together, may represent a $C_3$-$C_{20}$ hydrocarbylene group;

$R^2$, $R^3$, $R^5$, $R^6$, $R^7$, and $R^8$ are each independently selected from hydrogen, an unsubstituted or substituted $C_1$-$C_{20}$ hydrocarbyl group such as an alkyl, aryl, alkaryl or aralkyl group, as for example, methyl, ethyl, i-propyl, butyl (all isomers), phenyl, toluyl, 2,6-diisopropylphenyl and the like; or any R groups and adjacent carbon atoms, such as $R^2$ and $R^3$, taken together can provide an unsubstituted or substituted $C_3$-$C_{20}$ ring forming hydrocarbylene group, such as hexylene, 1,8-naphthylene and the like.

Z, A and each L and L' are as defined above in connection with Formula II. It is preferred that Z be selected from nickel or palladium and that each L and L' be independently selected from chlorine, bromine, iodine or a $C_1$-$C_8$ (more preferably $C_1$-$C_4$) alkyl. The bonds depicted by a dotted line signify the possibility that the atoms bridged by said dotted line may be bridged by a single or double bond.

It will be understood that the particular identity of b, c, and d in Formula II will be dependent on (i) the identity of Z, (ii) the identity of heteroatom A, (iii) whether the bond between heteroatom A and its adjacent ring carbon is single or double, and (iv) whether the bond between heteroatom A and Z is dative or covalent.

More specifically, when $A^1$ in Formula IIa is nitrogen it will always have at least 3 available vacancies for bonding. If the bond between such N and its adjacent ring carbon is a double covalent bond, the b for $R^5$ will be zero, and only one further vacancy will be available in the N for either a covalent bond with Z, in which case c and d are zero, or if the bond with Z is dative, the N can covalently bond with its associated $R^1$ or $R^7$ group in which case either d or c is 1. Similarly, if the bonds between the N and the adjacent ring carbon and between N and Z are single covalent, the b of $R^5$ can be 1, and either d or the c of $R^7$ will be 1. Alternatively if the bond between N and Z is dative in this scenario, both d, and the c of $R^7$ can be 1.

The above rules are modified when $A^1$ in Formula IIa is oxygen because oxygen has only 2 available vacancies rather than the 3 vacancies for N. Thus, when $A^1$ is oxygen and is double covalently bonded to the adjacent ring carbon, the bond between $A^1$ and Z will be dative and b of $R^5$, c of $R^7$ and d will be 0. If such double bond is replaced by a single bond, the b of $R^5$ can be 1 and either the bond between $A^1$ and Z is single covalent, in which case c of $R^2$ and d are both 0, or if dative, either c of $R^7$ or d can be 1.

The vacancy rules when $A^1$ is sulfur are the same as for $A^1$ being oxygen. Phosphorous typically has 3 available vacancies for 3 single covalent bonds or 1 double covalent bond and 1 single covalent bond. Phosphorous will typically not covalently bond with Z, its association with Z being that of a dative bond.

Similar considerations to those described above for $A^1$ apply in respect to $A^2$ of Formula IIa and in respect to all A groups and a, b, c, of Formula IIIa discussed hereinafter.

Illustrative of bidentate ligand/transition metal complex pre-catalyst compounds which are useful in providing the catalyst composition of the present invention are compounds of IIa having the following combination of groups:

TABLE I

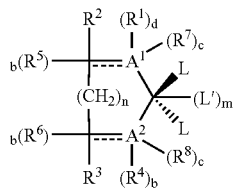

IIa

| # | n | $R^1/R^4$ | $R^2/R^3$ | $R^5/R^6$ | $A^1$ | $A^2$ | $L^1$ | $L^2$ | a | b | c | d | Z |
|---|---|-----------|-----------|-----------|-------|-------|-------|-------|---|---|---|---|----|
| 1 | 0 | 2,6-iPr$_2$Ph | Me | N/A | N | N | Me | e | 0 | 0 | 0 | 1 | Pd |
| 2 | 0 | 2,6-iPr$_2$Ph | Me | N/A | N | N | Me | Me | 0 | 0 | 0 | 1 | Pd |
| 3 | 0 | 2,6-iPr$_2$Ph | Me | N/A | N | N | Me | Br | 0 | 0 | 0 | 1 | Pd |
| 4 | 0 | 2,6-iPr$_2$Ph | Me | N/A | N | N | Me | Cl | 0 | 0 | 0 | 1 | Pd |
| 5 | 0 | 2,6-iPr$_2$Ph | Me | N/A | N | N | Br | Br | 0 | 0 | 0 | 1 | Pd |
| 6 | 0 | 2,6-iPr$_2$Ph | Me | N/A | N | N | Cl | Cl | 0 | 0 | 0 | 1 | Pd |
| 7 | 0 | 2,6-iPr$_2$Ph | Me | N/A | N | N | Br | Br | 0 | 0 | 0 | 1 | Ni |
| 8 | 0 | 2,6-iPr$_2$Ph | Me | N/A | N | N | Cl | Cl | 0 | 0 | 0 | 1 | Ni |
| 9 | 0 | 2,6-iPr$_2$Ph | Me | N/A | N | N | Me | Me | 0 | 0 | 0 | 1 | Ni |
| 10 | 0 | 2,6-iPr$_2$Ph | Me | N/A | N | N | Me | Br | 0 | 0 | 0 | 1 | Ni |
| 11 | 0 | 2,6-iPr$_2$Ph | Me | N/A | N | N | Me | Cl | 0 | 0 | 0 | 1 | Ni |
| 12 | 0 | 2,6-Me$_2$Ph | Me | N/A | N | N | Me | e | 0 | 0 | 0 | 1 | Pd |
| 13 | 0 | 2,6-Me$_2$Ph | Me | N/A | N | N | Me | Me | 0 | 0 | 0 | 1 | Pd |
| 14 | 0 | 2,6-Me$_2$Ph | Me | N/A | N | N | Me | Br | 0 | 0 | 0 | 1 | Pd |
| 15 | 0 | 2,6-Me$_2$Ph | Me | N/A | N | N | Me | Cl | 0 | 0 | 0 | 1 | Pd |
| 16 | 0 | 2,6-Me$_2$Ph | Me | N/A | N | N | Br | Br | 0 | 0 | 0 | 1 | Pd |
| 17 | 0 | 2,6-Me$_2$Ph | Me | N/A | N | N | Cl | Cl | 0 | 0 | 0 | 1 | Pd |
| 18 | 0 | 2,6-iPr$_2$Ph | H | N/A | N | N | Me | e | 0 | 0 | 0 | 1 | Pd |
| 19 | 0 | 2,6-iPr$_2$Ph | H | N/A | N | N | Me | Me | 0 | 0 | 0 | 1 | Pd |
| 20 | 0 | 2,6-iPr$_2$Ph | H | N/A | N | N | Me | Br | 0 | 0 | 0 | 1 | Pd |
| 21 | 0 | 2,6-iPr$_2$Ph | H | N/A | N | N | Me | Cl | 0 | 0 | 0 | 1 | Pd |
| 22 | 0 | 2,6-iPr$_2$Ph | H | N/A | N | N | Br | Br | 0 | 0 | 0 | 1 | Pd |
| 23 | 0 | 2,6-iPr$_2$Ph | H | N/A | N | N | Cl | Cl | 0 | 0 | 0 | 1 | Pd |
| 24 | 0 | 2,6-iPr$_2$Ph | H | N/A | N | N | Br | Br | 0 | 0 | 0 | 1 | Ni |
| 25 | 0 | 2,6-iPr$_2$Ph | H | N/A | N | N | Cl | Cl | 0 | 0 | 0 | 1 | Ni |
| 26 | 0 | 2,6-iPr$_2$Ph | H | N/A | N | N | Me | Me | 0 | 0 | 0 | 1 | Ni |
| 27 | 0 | 2,6-iPr$_2$Ph | H | N/A | N | N | Me | Br | 0 | 0 | 0 | 1 | Ni |
| 28 | 0 | 2,6-iPr$_2$Ph | H | N/A | N | N | Me | Cl | 0 | 0 | 0 | 1 | Ni |
| 29 | 0 | 2,6-iPr$_2$Ph | An | N/A | N | N | Me | e | 0 | 0 | 0 | 1 | Pd |
| 30 | 0 | 2,6-iPr$_2$Ph | An | N/A | N | N | Me | Me | 0 | 0 | 0 | 1 | Pd |
| 31 | 0 | 2,6-iPr$_2$Ph | An | N/A | N | N | Me | Br | 0 | 0 | 0 | 1 | Pd |
| 32 | 0 | 2,6-iPr$_2$Ph | An | N/A | N | N | Me | Cl | 0 | 0 | 0 | 1 | Pd |
| 33 | 0 | 2,6-iPr$_2$Ph | An | N/A | N | N | Br | Br | 0 | 0 | 0 | 1 | Pd |
| 34 | 0 | 2,6-iPr$_2$Ph | An | N/A | N | N | Cl | Cl | 0 | 0 | 0 | 1 | Pd |
| 35 | 0 | 2,6-iPr$_2$Ph | An | N/A | N | N | Br | Br | 0 | 0 | 0 | 1 | Ni |
| 36 | 0 | 2,6-iPr$_2$Ph | An | N/A | N | N | Cl | Cl | 0 | 0 | 0 | 1 | Ni |
| 37 | 0 | 2,6-iPr$_2$Ph | An | N/A | N | N | Me | Me | 0 | 0 | 0 | 1 | Ni |
| 38 | 0 | 2,6-iPr$_2$Ph | An | N/A | N | N | Me | Br | 0 | 0 | 0 | i | Ni |
| 39 | 0 | 2,6-iPr$_2$Ph | An | N/A | N | N | Me | Cl | 0 | 0 | 0 | 1 | Ni |
| 40 | 0 | 2,6-Me$_2$Ph | An | N/A | N | N | Me | e | 0 | 0 | 0 | 1 | Pd |
| 41 | 0 | 2,6-Me$_2$Ph | An | N/A | N | N | Me | Me | 0 | 0 | 0 | 1 | Pd |
| 42 | 0 | 2,6-Me$_2$Ph | An | N/A | N | N | Me | Br | 0 | 0 | 0 | 1 | Pd |
| 43 | 0 | 2,6-Me$_2$Ph | An | N/A | N | N | Me | Cl | 0 | 0 | 0 | 1 | Pd |
| 44 | 0 | 2,6-Me$_2$Ph | An | N/A | N | N | Br | Br | 0 | 0 | 0 | 1 | Pd |
| 45 | 0 | 2,6-Me$_2$Ph | An | N/A | N | N | Cl | Cl | 0 | 0 | 0 | 1 | Pd |
| 46 | 0 | 2,6-Me$_2$Ph | H | N/A | N | N | Me | e | 0 | 0 | 0 | 1 | Pd |
| 47 | 0 | 2,6-Me$_2$Ph | H | N/A | N | N | Me | Me | 0 | 0 | 0 | 1 | Pd |
| 48 | 0 | 2,6-Me$_2$Ph | H | N/A | N | N | Me | Br | 0 | 0 | 0 | 1 | Pd |
| 49 | 0 | 2,6-Me$_2$Ph | H | N/A | N | N | Me | Cl | 0 | 0 | 0 | 1 | Pd |
| 50 | 0 | 2,6-Me$_2$Ph | H | N/A | N | N | Br | Br | 0 | 0 | 0 | 1 | Pd |
| 51 | 0 | 2,6-Me$_2$Ph | H | N/A | N | N | Cl | Cl | 0 | 0 | 0 | 1 | Pd |
| 52 | 0 | 2,6-Me$_2$Ph | Me | N/A | N | N | Br | Br | 0 | 0 | 0 | 1 | Ni |

TABLE I-continued $$\underset{b}{(R^5)}\overset{R^2}{\underset{(CH_2)_n}{\overset{|}{A^1}}}\overset{(R^1)_d}{\underset{|}{\overset{|}{\underset{L}{\overset{(R^7)_c}{\underset{L}{\overset{|}{\underset{(L')_m}{\overset{|}{\underset{R^3}{\overset{(R^8)_c}{(R^4)_b}}}}}}}}}}}\quad \text{IIa}$$

| # | n | R¹/R⁴ | R²/R³ | R⁵/R⁶ | A¹ | A² | L¹ | L² | a | b | c | d | Z |
|---|---|---|---|---|---|---|---|---|---|---|---|---|---|
| 53 | 0 | 2,6-Me₂Ph | Me | N/A | N | N | Cl | Cl | 0 | 0 | 0 | 1 | Ni |
| 54 | 0 | 2,6-Me₂Ph | Me | N/A | N | N | Me | Me | 0 | 0 | 0 | 1 | Ni |
| 55 | 0 | 2,6-Me₂Ph | Me | N/A | N | N | Me | Br | 0 | 0 | 0 | 1 | Ni |
| 56 | 0 | 2,6-Me₂Ph | Me | N/A | N | N | Me | Cl | 0 | 0 | 0 | 1 | Ni |
| 57 | 0 | 2,4,6-Me₃Ph | Me | N/A | N | N | Me | e | 0 | 0 | 0 | 1 | Pd |
| 58 | 0 | 2,4,6-Me₃Ph | Me | N/A | N | N | Me | Me | 0 | 0 | 0 | 1 | Pd |
| 59 | 0 | 2,4,6-Me₃Ph | Me | N/A | N | N | Me | Br | 0 | 0 | 0 | 1 | Pd |
| 60 | 0 | 2,4,6-Me₃Ph | Me | N/A | N | N | Me | Cl | 0 | 0 | 0 | 1 | Pd |
| 61 | 0 | 2,4,6-Me₃Ph | Me | N/A | N | N | Br | Br | 0 | 0 | 0 | 1 | Pd |
| 62 | 0 | 2,4,6-Me₃Ph | Me | N/A | N | N | Cl | Cl | 0 | 0 | 0 | 1 | Pd |
| 63 | 0 | 2,4,6-Me₃Ph | Me | N/A | N | N | Br | Br | 0 | 0 | 0 | 1 | Ni |
| 64 | 0 | 2,4,6-Me₃Ph | Me | N/A | N | N | Cl | Cl | 0 | 0 | 0 | 1 | Ni |
| 65 | 0 | 2,4,6-Me₃Ph | Me | N/A | N | N | Me | Me | 0 | 0 | 0 | 1 | Ni |
| 66 | 0 | 2,4,6-Me₃Ph | Me | N/A | N | N | Me | Br | 0 | 0 | 0 | 1 | Ni |
| 67 | 0 | 2,4,6-Me₃Ph | Me | N/A | N | N | Me | Cl | 0 | 0 | 0 | 1 | Ni |
| 68 | 0 | 2,4,6-Me₃Ph | H | N/A | N | N | Me | e | 0 | 0 | 0 | 1 | Pd |
| 69 | 0 | 2,4,6-Me₃Ph | H | N/A | N | N | Me | Me | 0 | 0 | 0 | 1 | Pd |
| 70 | 0 | 2,4,6-Me₃Ph | H | N/A | N | N | Me | Br | 0 | 0 | 0 | 1 | Pd |
| 71 | 0 | 2,4,6-Me₃Ph | H | N/A | N | N | Me | Cl | 0 | 0 | 0 | 1 | Pd |
| 72 | 0 | 2,4,6-Me₃Ph | H | N/A | N | N | Br | Br | 0 | 0 | 0 | 1 | Pd |
| 73 | 0 | 2,4,6-Me₃Ph | H | N/A | N | N | Cl | Cl | 0 | 0 | 0 | 1 | Pd |
| 74 | 0 | 2,4,6-Me₃Ph | H | N/A | N | N | Br | Br | 0 | 0 | 0 | 1 | Ni |
| 75 | 0 | 2,4,6-Me₃Ph | H | N/A | N | N | Cl | Cl | 0 | 0 | 0 | 1 | Ni |
| 76 | 0 | 2,4,6-Me₃Ph | H | N/A | N | N | Me | Me | 0 | 0 | 0 | 1 | Ni |
| 77 | 0 | 2,4,6-Me₃Ph | H | N/A | N | N | Me | Br | 0 | 0 | 0 | 1 | Ni |
| 78 | 0 | 2,4,6-Me₃Ph | H | N/A | N | N | Me | Cl | 0 | 0 | 0 | 1 | Ni |
| 79 | 0 | 2,4,6-Me₃Ph | An | N/A | N | N | Me | e | 0 | 0 | 0 | 1 | Pd |
| 80 | 0 | 2,4,6-Me₃Ph | An | N/A | N | N | Me | Me | 0 | 0 | 0 | 1 | Pd |
| 81 | 0 | 2,4,6-Me₃Ph | An | N/A | N | N | Me | Br | 0 | 0 | 0 | 1 | Pd |
| 82 | 0 | 2,4,6-Me₃Ph | An | N/A | N | N | Me | Cl | 0 | 0 | 0 | 1 | Pd |
| 83 | 0 | 2,4,6-Me₃Ph | An | N/A | N | N | Br | Br | 0 | 0 | 0 | 1 | Pd |
| 84 | 0 | 2,4,6-Me₃Ph | An | N/A | N | N | Cl | Cl | 0 | 0 | 0 | 1 | Pd |
| 85 | 0 | 2,4,6-Me₃Ph | An | N/A | N | N | Br | Br | 0 | 0 | 0 | 1 | Ni |
| 86 | 0 | 2,4,6-Me₃Ph | An | N/A | N | N | Cl | Cl | 0 | 0 | 0 | 1 | Ni |
| 87 | 0 | 2,4,6-Me₃Ph | An | N/A | N | N | Me | Me | 0 | 0 | 0 | 1 | Ni |
| 88 | 0 | 2,4,6-Me₃Ph | An | N/A | N | N | Me | Br | 0 | 0 | 0 | 1 | Ni |
| 89 | 0 | 2,4,6-Me₃Ph | An | N/A | N | N | Me | Cl | 0 | 0 | 0 | 1 | Ni |
| 90 | 0 | Ph | j | N/A | N | N | Me | Me | 0 | 0 | 0 | 1 | Pd |
| 91 | 0 | Ph | Me | N/A | N | N | Me | Me | 0 | 0 | 0 | 1 | Pd |
| 92 | 0 | Ph | H | N/A | N | N | Me | Me | 0 | 0 | 0 | 1 | Pd |
| 93 | 0 | Ph | An | N/A | N | N | Me | Me | 0 | 0 | 0 | 1 | Pd |
| 94 | 0 | Ph | j | N/A | N | N | Me | Cl | 0 | 0 | 0 | 1 | Pd |
| 95 | 0 | Ph | Me | N/A | N | N | Me | Cl | 0 | 0 | 0 | 1 | Pd |
| 96 | 0 | Ph | H | N/A | N | N | Me | Cl | 0 | 0 | 0 | 1 | Pd |
| 97 | 0 | Ph | An | N/A | N | N | Me | Cl | 0 | 0 | 0 | 1 | Pd |
| 98 | 0 | 2-PhPh | j | N/A | N | N | Me | Me | 0 | 0 | 0 | 1 | Pd |
| 99 | 0 | 2-PhPh | Me | N/A | N | N | Me | Me | 0 | 0 | 0 | 1 | Pd |
| 100 | 0 | 2-PhPh | H | N/A | N | N | Me | Me | 0 | 0 | 0 | 1 | Pd |
| 101 | 0 | 2-PhPh | An | N/A | N | N | Me | Me | 0 | 0 | 0 | 1 | Pd |
| 102 | 0 | 2-PhPh | j | N/A | N | N | Me | Cl | 0 | 0 | 0 | 1 | Pd |
| 103 | 0 | 2-PhPh | Me | N/A | N | N | Me | Cl | 0 | 0 | 0 | 1 | Pd |
| 104 | 0 | 2-PhPh | H | N/A | N | N | Me | Cl | 0 | 0 | 0 | 1 | Pd |
| 105 | 0 | 2-PhPh | An | N/A | N | N | Me | Cl | 0 | 0 | 0 | 1 | Pd |
| 106 | 0 | 2,6-EtPh | j | N/A | N | N | Me | Me | 0 | 0 | 0 | 1 | Pd |
| 107 | 0 | 2,6-EtPh | Me | N/A | N | N | Me | Me | 0 | 0 | 0 | 1 | Pd |
| 108 | 0 | 2,6-EtPh | H | N/A | N | N | Me | Me | 0 | 0 | 0 | 1 | Pd |
| 109 | 0 | 2,6-EtPh | An | N/A | N | N | Me | Me | 0 | 0 | 0 | 1 | Pd |
| 110 | 0 | 2,6-EtPh | j | N/A | N | N | Me | Cl | 0 | 0 | 0 | 1 | Pd |
| 111 | 0 | 2,6-EtPh | Me | N/A | N | N | Me | Cl | 0 | 0 | 0 | 1 | Pd |
| 112 | 0 | 2,6-EtPh | H | N/A | N | N | Me | Cl | 0 | 0 | 0 | 1 | Pd |
| 113 | 0 | 2,6-EtPh | An | N/A | N | N | Me | Cl | 0 | 0 | 0 | 1 | Pd |
| 114 | 0 | 2-t-BuPh | j | N/A | N | N | Me | Me | 0 | 0 | 0 | 1 | Pd |
| 115 | 0 | 2-t-BuPh | Me | N/A | N | N | Me | Me | 0 | 0 | 0 | 1 | Pd |
| 116 | 0 | 2-t-BuPh | H | N/A | N | N | Me | Me | 0 | 0 | 0 | 1 | Pd |
| 117 | 0 | 2-t-BuPh | An | N/A | N | N | Me | Me | 0 | 0 | 0 | 1 | Pd |
| 118 | 0 | 2-t-BuPh | j | N/A | N | N | Me | Cl | 0 | 0 | 0 | 1 | Pd |
| 119 | 0 | 2-t-BuPh | Me | N/A | N | N | Me | Cl | 0 | 0 | 0 | 1 | Pd |

TABLE I-continued

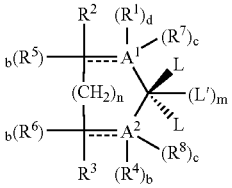

| # | n | R$^1$/R$^4$ | R$^2$/R$^3$ | R$^5$/R$^6$ | A$^1$ | A$^2$ | L$^1$ | L$^2$ | a | b | c | d | Z |
|---|---|---|---|---|---|---|---|---|---|---|---|---|---|
| 120 | 0 | 2-t-BuPh | H | N/A | N | N | Me | Cl | 0 | 0 | 0 | 1 | Pd |
| 121 | 0 | 2-t-BuPh | An | N/A | N | N | Me | Cl | 0 | 0 | 0 | 1 | Pd |
| 122 | 0 | 1-Np | j | N/A | N | N | Me | Me | 0 | 0 | 0 | 1 | Pd |
| 123 | 0 | 1-Np | Me | N/A | N | N | Me | Me | 0 | 0 | 0 | 1 | Pd |
| 124 | 0 | 1-Np | H | N/A | N | N | Me | Me | 0 | 0 | 0 | 1 | Pd |
| 125 | 0 | 1-Np | An | N/A | N | N | Me | Me | 0 | 0 | 0 | 1 | Pd |
| 126 | 0 | PhMe | j | N/A | N | N | Me | Cl | 0 | 0 | 0 | 1 | Pd |
| 127 | 0 | PhMe | Me | N/A | N | N | Me | Cl | 0 | 0 | 0 | 1 | Pd |
| 128 | 0 | PhMe | H | N/A | N | N | Me | Cl | 0 | 0 | 0 | 1 | Pd |
| 129 | 0 | PhMe | An | N/A | N | N | Me | Cl | 0 | 0 | 0 | 1 | Pd |
| 130 | 0 | PhMe | j | N/A | N | N | Me | Me | 0 | 0 | 0 | 1 | Pd |
| 131 | 0 | PhMe | Me | N/A | N | N | Me | Me | 0 | 0 | 0 | 1 | Pd |
| 132 | 0 | PhMe | H | N/A | N | N | Me | Me | 0 | 0 | 0 | 1 | Pd |
| 133 | 0 | PhMe | An | N/A | N | N | Me | Me | 0 | 0 | 0 | 1 | Pd |
| 134 | 0 | PhMe | j | N/A | N | N | Me | Cl | 0 | 0 | 0 | 1 | Pd |
| 135 | 0 | PhMe | Me | N/A | N | N | Me | Cl | 0 | 0 | 0 | 1 | Pd |
| 136 | 0 | PhMe | H | N/A | N | N | Me | Cl | 0 | 0 | 0 | 1 | Pd |
| 137 | 0 | PhMe | An | N/A | N | N | Me | Cl | 0 | 0 | 0 | 1 | Pd |
| 138 | 0 | Ph$_2$Me | j | N/A | N | N | Me | Me | 0 | 0 | 0 | 1 | Pd |
| 139 | 0 | Ph$_2$Me | Me | N/A | N | N | Me | Me | 0 | 0 | 0 | 1 | Pd |
| 140 | 0 | Ph$_2$Me | H | N/A | N | N | Me | Me | 0 | 0 | 0 | 1 | Pd |
| 141 | 0 | Ph$_2$Me | An | N/A | N | N | Me | Me | 0 | 0 | 0 | 1 | Pd |
| 142 | 0 | Ph$_2$Me | j | N/A | N | N | Me | Cl | 0 | 0 | 0 | 1 | Pd |
| 143 | 0 | Ph$_2$Me | Me | N/A | N | N | Me | Cl | 0 | 0 | 0 | 1 | Pd |
| 144 | 0 | Ph$_2$Me | H | N/A | N | N | Me | Cl | 0 | 0 | 0 | 1 | Pd |
| 145 | 0 | Ph$_2$Me | An | N/A | N | N | Me | Cl | 0 | 0 | 0 | 1 | Pd |
| 146 | 0 | 2,6-t-BuPh | j | N/A | N | N | Me | Me | 0 | 0 | 0 | 1 | Pd |
| 147 | 0 | 2,6-t-BuPh | Me | N/A | N | N | Me | Me | 0 | 0 | 0 | 1 | Pd |
| 148 | 0 | 2,6-t-BuPh | H | N/A | N | N | Me | Me | 0 | 0 | 0 | 1 | Pd |
| 149 | 0 | 2,6-t-BuPh | An | N/A | N | N | Me | Me | 0 | 0 | 0 | 1 | Pd |
| 150 | 0 | 2,6-t-BuPh | j | N/A | N | N | Me | Cl | 0 | 0 | 0 | 1 | Pd |
| 151 | 0 | 2,6-t-BuPh | Me | N/A | N | N | Me | Cl | 0 | 0 | 0 | 1 | Pd |
| 152 | 0 | 2,6-t-BuPh | H | N/A | N | N | Me | Cl | 0 | 0 | 0 | 1 | Pd |
| 153 | 0 | 2,6-t-BuPh | An | N/A | N | N | Me | Cl | 0 | 0 | 0 | 1 | Pd |
| 154 | 0 | 2,6-t-BuPh | H | N/A | N | N | Br | Br | 0 | 0 | 0 | 1 | Ni |
| 155 | 0 | 2,6-t-Bu$_2$Ph | Me | N/A | N | N | Br | Br | 0 | 0 | 0 | 1 | Ni |
| 156 | 0 | 2,6-t-Bu$_2$Ph | An | N/A | N | N | Br | Br | 0 | 0 | 0 | 1 | Ni |
| 157 | 0 | 2,6-t-Bu$_2$Ph | H | N/A | N | N | Br | Br | 0 | 0 | 0 | 1 | Ni |
| 158 | 0 | 2,6-t-Bu$_2$Ph | Me | N/A | N | N | Br | Br | 0 | 0 | 0 | 1 | Ni |
| 159 | 0 | 2-6-t-Bu$_2$Ph | An | N/A | N | N | Br | Br | 0 | 0 | 0 | 1 | Ni |
| 160 | 0 | Ph | H | N/A | N | N | Br | Br | 0 | 0 | 0 | 1 | Ni |
| 161 | 0 | Ph | Me | N/A | N | N | Br | Br | 0 | 0 | 0 | 1 | Ni |
| 162 | 0 | Ph | An | N/A | N | N | Br | Br | 0 | 0 | 0 | 1 | Ni |
| 163 | 0 | 2-PhPh | H | N/A | N | N | Br | Br | 0 | 0 | 0 | 1 | Ni |
| 164 | 0 | 2-PhPh | Me | N/A | N | N | Br | Br | 0 | 0 | 0 | 1 | Ni |
| 165 | 0 | 2-PhPh | An | N/A | N | N | Br | Br | 0 | 0 | 0 | 1 | Ni |
| 166 | 0 | 2-iPr-6-MePh | H | N/A | N | N | Br | Br | 0 | 0 | 0 | 1 | Ni |
| 167 | 0 | 2-iPr-6-MePh | Me | N/A | N | N | Br | Br | 0 | 0 | 0 | 1 | Ni |
| 168 | 0 | 2-iPr-6-MePh | An | N/A | N | N | Br | Br | 0 | 0 | 0 | 1 | Ni |
| 169 | 0 | 2,5-t-BuPh | H | N/A | N | N | Br | Br | 0 | 0 | 0 | 1 | Ni |
| 170 | 0 | 2,5-t-BuPh | Me | N/A | N | N | Br | Br | 0 | 0 | 0 | 1 | Ni |
| 171 | 0 | 2,5-t-BuPh | An | N/A | N | N | Br | Br | 0 | 0 | 0 | 1 | Ni |
| 172 | 0 | 2,6-EtPh | H | N/A | N | N | Br | Br | 0 | 0 | 0 | 1 | Ni |
| 173 | 0 | 2,6-EtPh | Me | N/A | N | N | Br | Br | 0 | 0 | 0 | 1 | Ni |
| 174 | 0 | 2,6-EtPh | An | N/A | N | N | Br | Br | 0 | 0 | 0 | 1 | Ni |
| 175 | 0 | 1-Np | H | N/A | N | N | Br | Br | 0 | 0 | 0 | 1 | Ni |
| 176 | 0 | 1-Np | Me | N/A | N | N | Br | Br | 0 | 0 | 0 | 1 | Ni |
| 177 | 0 | 1-Np | An | N/A | N | N | Br | Br | 0 | 0 | 0 | 1 | Ni |
| 178 | 0 | Ph | Ph | N/A | N | N | Br | Br | 0 | 0 | 0 | 1 | Ni |
| 179 | 0 | 2,4,6-Me$_3$Ph | H | N/A | N | N | Br | Br | 0 | 0 | 0 | 1 | Ni |
| 180 | 0 | 2,4,6-Me$_3$Ph | Me | N/A | N | N | Br | Br | 0 | 0 | 0 | 1 | Ni |
| 181 | 0 | 2,4,6-Me$_3$Ph | An | N/A | N | N | Br | Br | 0 | 0 | 0 | 1 | Ni |
| 182 | 0 | 2,4,6-Me$_3$Ph | Ph | N/A | N | N | Br | Br | 0 | 0 | 0 | 1 | Ni |
| 183 | 1 | 2,6-Pr$_2$Pr | H | H | N | N | Cl | Cl | 0 | 0 | 0 | 1 | SY |
| 184 | 2 | 2,6-Pr$_2$Pr | H | H | N | N | Cl | Cl | 0 | 0 | 0 | 1 | SY |
| 185 | 3 | 2,6-Pr$_2$Pr | H | H | N | N | Cl | Cl | 0 | 0 | 0 | 1 | SY |
| 186 | 1 | 2,6-Pr$_2$Pr | Me | Me | N | N | Cl | Cl | 0 | 0 | 0 | 1 | SY |

TABLE I-continued

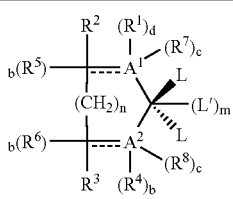

IIa

| # | n | R¹/R⁴ | R²/R³ | R⁵/R⁶ | A¹ | A² | L¹ | L² | a | b | c | d | Z |
|---|---|---|---|---|---|---|---|---|---|---|---|---|---|
| 187 | 2 | 2,6-Pr₂Pr | Me | Me | N | N | Cl | Cl | 0 | 0 | 0 | 1 | SY |
| 188 | 3 | 2,6-Pr₂Pr | Me | Me | N | N | Cl | Cl | 0 | 0 | 0 | 1 | SY |
| 189 | 1 | 2,6-Me₂Ph | H | H | N | N | Cl | Cl | 0 | 0 | 0 | 1 | SY |
| 190 | 2 | 2,6-Me₂Ph | H | H | N | N | Cl | Cl | 0 | 0 | 0 | 1 | SY |
| 191 | 3 | 2,6-Me₂Ph | H | H | N | N | Cl | Cl | 0 | 0 | 0 | 1 | SY |
| 192 | 1 | 2,6-Me₂Ph | Me | Me | N | N | Cl | Cl | 0 | 0 | 0 | 1 | SY |
| 193 | 2 | 2,6-Me₂Ph | Me | Me | N | N | Cl | Cl | 0 | 0 | 0 | 1 | SY |
| 194 | 3 | 2,6-Me₂Ph | Me | Me | N | N | Cl | Cl | 0 | 0 | 0 | 1 | SY |
| 195 | 1 | 2,4,6-Me₃Ph | H | H | N | N | Cl | Cl | 0 | 0 | 0 | 1 | SY |
| 196 | 2 | 2,4,6-Me₃Ph | H | H | N | N | Cl | Cl | 0 | 0 | 0 | 1 | SY |
| 197 | 3 | 2,4,6-Me₃Ph | H | H | N | N | Cl | Cl | 0 | 0 | 0 | 1 | SY |
| 198 | 1 | 2,4,6-Me₃Ph | Me | Me | N | N | Cl | Cl | 0 | 0 | 0 | 1 | SY |
| 199 | 2 | 2,4,6-Me₃Ph | Me | Me | N | N | Cl | Cl | 0 | 0 | 0 | 1 | SY |
| 200 | 3 | 2,4,6-Me₃Ph | Me | Me | N | N | Cl | Cl | 0 | 0 | 0 | 1 | SY |
| *201 | 1 | 2,6-iPr₂Ph | H | H | N | N | Cl | Cl | 1 | 0 | 0 | 1 | CMW |
| 202 | 2 | 2,6-iPr₂Ph | H | H | N | N | Cl | Cl | 1 | 0 | 0 | 1 | CMW |
| 203 | 3 | 2,6-iPr₂Ph | H | H | N | N | Cl | Cl | 1 | 0 | 0 | 1 | CMW |
| 204 | 1 | 2,6-iPrPh | Me | Me | N | N | Cl | Cl | 1 | 0 | 0 | 1 | CMW |
| 205 | 2 | 2,6-iPrPh | Me | Me | N | N | Cl | Cl | 1 | 0 | 0 | 1 | CMW |
| 206 | 3 | 2,6-iPrPh | Me | Me | N | N | Cl | Cl | 1 | 0 | 0 | 1 | CMW |
| 207 | 1 | 2,6,Me₂Ph | H | H | N | N | Cl | Cl | 1 | 0 | 0 | 1 | CMW |
| 208 | 2 | 2,6,Me₂Ph | H | H | N | N | Cl | Cl | 1 | 0 | 0 | 1 | CMW |
| 209 | 3 | 2,6,Me₂Ph | H | H | N | N | Cl | Cl | 1 | 0 | 0 | 1 | CMW |
| 210 | 1 | 2,6,Me₂Ph | Me | Me | N | N | Cl | Cl | 1 | 0 | 0 | 1 | CMW |
| 211 | 2 | 2,6,Me₂Ph | Me | Me | N | N | Cl | Cl | 1 | 0 | 0 | 1 | CMW |
| 212 | 3 | 2,6,Me₂Ph | Me | Me | N | N | Cl | Cl | 1 | 0 | 0 | 1 | CMW |
| 213 | 1 | 2,4,6-Me₃Ph | H | H | N | N | Cl | Cl | 1 | 0 | 0 | 1 | CMW |
| 214 | 2 | 2,4,6-Me₃Ph | H | H | N | N | Cl | Cl | 1 | 0 | 0 | 1 | CMW |
| 215 | 3 | 2,4,6-Me₃Ph | H | H | N | N | Cl | Cl | 1 | 0 | 0 | 1 | CMW |
| 216 | 1 | 2,4,6-Me₃Ph | Me | Me | N | N | Cl | Cl | 1 | 0 | 0 | 1 | CMW |
| 217 | 2 | 2,4,6-Me₃Ph | Me | Me | N | N | Cl | Cl | 1 | 0 | 0 | 1 | CMW |
| 218 | 3 | 2,4,6-Me₃Ph | Me | Me | N | N | Cl | Cl | 1 | 0 | 0 | 1 | CMW |
| 219 | 1 | 2,6-iPr₂Ph | H | H | N | N | Cl | Cl | 1 | 0 | 0 | 1 | TZH |
| 220 | 2 | 2,6-iPr₂Ph | H | H | N | N | Cl | Cl | 1 | 0 | 0 | 1 | TZH |
| 221 | 3 | 2,6-iPr₂Ph | H | H | N | N | Cl | Cl | 1 | 0 | 0 | 1 | TZH |
| 222 | 1 | 2,6-iPr₂Ph | Me | Me | N | N | Cl | Cl | 1 | 0 | 0 | 1 | TZH |
| 223 | 2 | 2,6-iPr₂Ph | Me | Me | N | N | Cl | Cl | 1 | 0 | 0 | 1 | TZH |
| 224 | 3 | 2,6-iPr₂Ph | Me | Me | N | N | Cl | Cl | 1 | 0 | 0 | 1 | TZH |
| 225 | 1 | 2,6-Me₂Ph | H | H | N | N | Cl | Cl | 1 | 0 | 0 | 1 | TZH |
| 226 | 2 | 2,6-Me₂Ph | H | H | N | N | Cl | Cl | 1 | 0 | 0 | 1 | TZH |
| 227 | 3 | 2,6-Me₂Ph | H | H | N | N | Cl | Cl | 1 | 0 | 0 | 1 | TZH |
| 228 | 1 | 2,6-Me₂Ph | Me | Me | N | N | Cl | Cl | 1 | 0 | 0 | 1 | TZH |
| 229 | 2 | 2,6-Me₂Ph | Me | Me | N | N | Cl | Cl | 1 | 0 | 0 | 1 | TZH |
| 230 | 3 | 2,6-Me₂Ph | Me | Me | N | N | Cl | Cl | 1 | 0 | 0 | 1 | TZH |
| 231 | 1 | 2,4,6-Me₃Ph | H | H | N | N | Cl | Cl | 1 | 0 | 0 | 1 | TZH |
| 232 | 2 | 2,4,6-Me₃Ph | H | H | N | N | Cl | Cl | 1 | 0 | 0 | 1 | TZH |
| 233 | 3 | 2,4,6-Me₃Ph | H | H | N | N | Cl | Cl | 1 | 0 | 0 | 1 | TZH |
| 234 | 1 | 2,4,6-Me₃Ph | Me | Me | N | N | Cl | Cl | 1 | 0 | 0 | 1 | TZH |
| 235 | 2 | 2,4,6-Me₃Ph | Me | Me | N | N | Cl | Cl | 1 | 0 | 0 | 1 | TZH |
| 236 | 3 | 2,4,6-Me₃Ph | Me | Me | N | N | Cl | Cl | 1 | 0 | 0 | 1 | TZH | e = the group (CH₂)₃CO₂Me

*L' is Cl for #'s 201 to 236

Note -

In Table I, above, the following convention and abbreviations are used. For R¹ and R⁴, when a substituted phenyl ring is present, the amount of substitution is indicated by the number of numbers indicating positions on the phenyl ring, as, for example, 2,6-iPr₂Ph represents 2,6-diisopropyl phenyl; iPr = isopropyl; Pr = propyl; Me = methyl; Et = ethyl; t-Bu = tert-butyl; Ph = phenyl; Np = naphthyl; An = 1,8-naphthalene; j is the group —C(Me)₂—CH₂—C(Me)₂—; and e is the group (CH₂)₃CO₂Me—, SY = Sc or Y; CMW = Cr, Mo or W; TZH = Ti, Zr, or Hf and N/A = not applicable.

The typical tridentate ligand/transition metal complex pre-catalyst compounds may, for example, be represented by the formula:

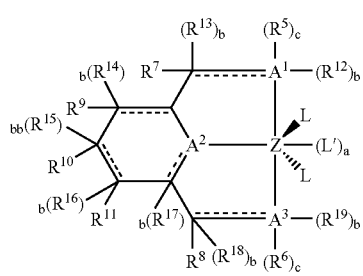

IIIa wherein:

$R^5$ and $R^6$ are each independently selected from hydrogen, or an unsubstituted or substituted aryl group wherein said substitution is an alkyl or a functional hetero group which is inert with respect to the contemplated polymerization;

$R^7$ and $R^8$ are each independently selected from hydrogen, an unsubstituted or substituted $C_1$-$C_{20}$ (preferably $C_1$-$C_6$) hydrocarbyl as, for example, alkyl (methyl, ethyl, propyl, pentyl and the like); aryl (phenyl, toluyl and the like) or a functional group which is inert with respect to the polymerization (e.g., nitro, halo and the like);

$R^9$ to $R^{19}$ are each independently selected from hydrogen, an unsubstituted or substituted $C_1$-$C_{20}$ hydrocarbyl or an inert functional group, all as described above for $R^7$;

a, b and c are each independently 0 or 1 and represent whether their associated R group is present or not;

Z is a transition metal as defined above, preferably Fe(II), Co(II) or Fe(III);

each $A^1$ to $A^3$ is independently selected from an atom selected as defined in connection with A of Formula II;

and each L and L' is independently selected from a halogen such as chlorine, bromine, iodine or a $C_1$-$C_8$ (preferably $C_1$-$C_5$) alkyl, or any two L groups, together in combination, represent an unsubstituted or substituted, saturated or unsaturated, hydrocarbylene group which together with Z forms a cyclic group, preferably a 3 to 7, most preferably 3 to 5 member ring cyclic group.

Preferred compounds of III(a) are those within each $R^9$, $R^{10}$ and $R^{11}$ are hydrogen; b is 0, c is 1, and $R^7$ and $R^8$ are each independently selected from halogen, hydrogen or a $C_1$-$C_6$ alkyl, preferably each is independently selected from methyl or hydrogen; and wherein $R^5$ and $R^6$ of IIa are each an aryl or substituted aryl group, preferably wherein the aryl contains substitution in the 2 position, the 2,6 positions or the 2,4,6 positions which is selected from a $C_1$-$C_6$ (most preferably $C_1$-$C_3$) alkyl and the remaining positions are each independently selected from hydrogen (most preferred), halogen or a $C_1$-$C_6$ (preferably $C_1$-$C_3$) alkyl.

Illustrative examples of tridentate ligand/transition metal complex pre-catalyst compounds which are useful in providing the catalyst composition of the present invention are compounds of Formula IIIa having the following combination of groups shown in Table II below:

TABLE II

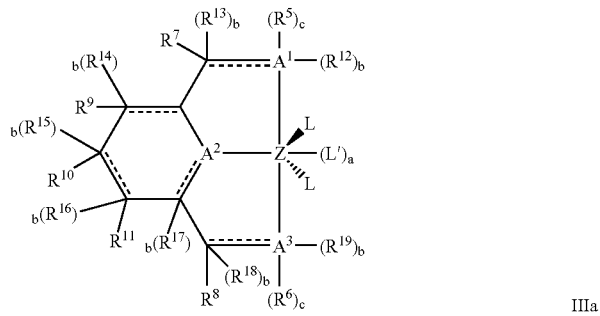

IIIa

| # | $R^5/R^6$ | $R^7/R^8$ | $R^9$ | $R^{10}$ | $R^{11}$ | $A^1$ | $A^2$ | $A^3$ | a | b | c | L | L' | Z |
|---|---|---|---|---|---|---|---|---|---|---|---|---|---|---|
| 1 | 2,6-di-iPrPh | Me | H | H | H | N | N | N | 0 | 0 | 1 | * | NA | Fe |
| 2 | 2,6-di-iPrPh | Me | H | H | H | N | N | N | 0 | 0 | 1 | * | NA | Fe |
| 3 | 2-t-BuPh | Me | H | H | H | N | N | N | 0 | 0 | 1 | * | NA | Fe |
| 4 | Ph | Me | H | H | H | N | N | N | 0 | 0 | 1 | * | NA | Fe |
| 5 | 2,6-di-iPrPh | Me | H | Me | H | N | N | N | 0 | 0 | 1 | * | NA | Fe |
| 6 | 2,6-di-iPrPh | Me | H | Me | H | N | N | N | 0 | 0 | 1 | * | NA | Fe |
| 7 | 2-t-BuPh | Me | H | Me | H | N | N | N | 0 | 0 | 1 | * | NA | Fe |
| 8 | Ph | Me | H | Me | H | N | N | N | 0 | 0 | 1 | * | NA | Fe |
| 9 | 2,6-di-iPrPh | Me | Me | Me | Me | N | N | N | 0 | 0 | 1 | * | NA | Fe |
| 10 | 2,6-di-iPrPh | Me | Me | Me | Me | N | N | N | 0 | 0 | 1 | * | NA | Fe |
| 11 | 2-t-BuPh | Me | Me | Me | Me | N | N | N | 0 | 0 | 1 | * | NA | Fe |
| 12 | Ph | Me | Me | Me | Me | N | N | N | 0 | 0 | 1 | * | NA | Fe |
| 13 | 2,4,6-Me$_3$Ph | Me | H | H | H | N | N | N | 0 | 0 | 1 | * | NA | Fe |
| 14 | 2,3,4,5,6-Me$_5$Ph | Me | H | H | H | N | N | N | 0 | 0 | 1 | * | NA | Fe |
| 15 | (2-t-BuMe$_2$Sil)Bz | Me | H | H | H | N | N | N | 0 | 0 | 1 | * | NA | Fe |
| 16 | (2-Me$_3$Sil)Bz | Me | H | H | H | N | N | N | 0 | 0 | 1 | * | NA | Fe |
| 17 | (2-PhMe$_2$Sil)Bz | Me | H | H | H | N | N | N | 0 | 0 | 1 | * | NA | Fe |
| 18 | (2-PhMeSil)Bz | Me | H | H | H | N | N | N | 0 | 0 | 1 | * | NA | Fe |

TABLE II-continued

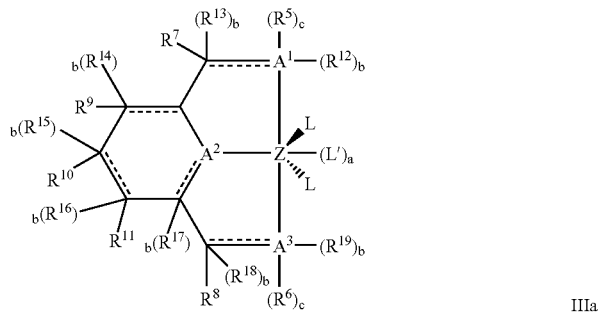

IIIa

| # | R5/R6 | R7/R8 | R9 | R10 | R11 | A1 | A2 | A3 | a | b | c | L | L' | Z |
|---|---|---|---|---|---|---|---|---|---|---|---|---|---|---|
| 19 | (2-Me2Sil)Bz | Me | H | H | H | N | N | N | 0 | 0 | 1 | * | NA | Fe |
| 20 | 2,6-di-iPrPh | Me | H | H | H | N | N | N | 0 | 0 | 1 | * | NA | Co |
| 21 | 2,6-di-iPrPh | Me | H | H | H | N | N | N | 0 | 0 | 1 | * | NA | Co |
| 22 | 2-t-BuPh | Me | H | H | H | N | N | N | 0 | 0 | 1 | * | NA | Co |
| 23 | Ph | Me | H | H | H | N | N | N | 0 | 0 | 1 | * | NA | Co |
| 24 | 2,6-di-iPrPh | Me | H | Me | H | N | N | N | 0 | 0 | 1 | * | NA | Co |
| 25 | 2,6-di-iPrPh | Me | H | Me | H | N | N | N | 0 | 0 | 1 | * | NA | Co |
| 26 | 2-t-BuPh | Me | H | Me | H | N | N | N | 0 | 0 | 1 | * | NA | Co |
| 27 | Ph | Me | H | Me | H | N | N | N | 0 | 0 | 1 | * | NA | Co |
| 28 | 2,6-di-iPrPh | Me | Me | Me | Me | N | N | N | 0 | 0 | 1 | * | NA | Co |
| 29 | 2,6-di-iPrPh | Me | Me | Me | Me | N | N | N | 0 | 0 | 1 | * | NA | Co |
| 30 | 2-t-BuPh | Me | Me | Me | Me | N | N | N | 0 | 0 | 1 | * | NA | Co |
| 31 | Ph | Me | Me | Me | Me | N | N | N | 0 | 0 | 1 | * | NA | Co |
| 32 | 2,4,6-(Me)3Ph | Me | H | H | H | N | N | N | 0 | 0 | 1 | * | NA | Co |
| 33 | 2,3,4,5,6-(Me)5Ph | Me | H | H | H | N | N | N | 0 | 0 | 1 | * | NA | Co |
| 34 | (2-t-BuMe2Sil)Bz | Me | H | H | H | N | N | N | 0 | 0 | 1 | * | NA | Co |
| 35 | 2-MePh | Me | H | H | H | N | N | N | 0 | 0 | 1 | * | NA | Fe |
| 36 | (2-Me3Sil)Bz | Me | H | H | H | N | N | N | 0 | 0 | 1 | * | NA | Co |
| 37 | (2-PhMe2Sil)Bz | Me | H | H | H | N | N | N | 0 | 0 | 1 | * | NA | Co |
| 38 | (2-PhMeSil)Bz | Me | H | H | H | N | N | N | 0 | 0 | 1 | * | NA | Co |
| 39 | (2-Me3Sil)Bz | Me | H | H | H | O | N | | 0 | 0 | 0 | * | NA | Co |
| 40 | NA | Me | H | H | H | O | N | | 0 | 0 | 0 | * | NA | Fe |
| 41 | NA | Me | H | Me | H | O | N | | 0 | 0 | 0 | * | NA | Fe |
| 42 | NA | i-Pr | H | H | H | O | N | | 0 | 0 | 0 | * | NA | Fe |
| 43 | NA | i-Pr | H | Me | H | O | N | | 0 | 0 | 0 | * | NA | Fe |
| 44 | NA | i-Pr | Me | Me | Me | O | N | | 0 | 0 | 0 | * | NA | Fe |
| 45 | NA | Ph | H | H | H | O | N | | 0 | 0 | 0 | * | NA | Fe |
| 46 | NA | Ph | H | Me | H | O | N | | 0 | 0 | 0 | * | NA | Fe |
| 47 | NA | Me | H | H | H | O | N | | 0 | 0 | 0 | * | NA | Co |
| 48 | NA | Me | H | Me | H | O | N | | 0 | 0 | 0 | * | NA | Co |
| 49 | NA | i-Pr | H | H | H | O | N | | 0 | 0 | 0 | * | NA | Co |
| 50 | NA | i-Pr | H | Me | H | O | N | | 0 | 0 | 0 | * | NA | Co |
| 51 | NA | i-Pr | Me | Me | Me | O | N | | 0 | 0 | 0 | * | NA | Co |
| 52 | NA | Ph | H | H | H | O | N | | 0 | 0 | 0 | * | NA | Co |
| 53 | NA | Ph | H | Me | H | O | N | | 0 | 0 | 0 | * | NA | Co |
| 54 | 2,6-iPr2Ph | Me | H | F | H | N | N | N | 1 | 0 | 1 | Cl | Cl | VNT |
| 55 | 2,6-iPr2Ph | Me | H | Cl | H | N | N | N | 1 | 0 | 1 | Cl | Cl | VNT |
| 56 | 2,6-iPr2Ph | Me | H | Br | H | N | N | N | 1 | 0 | 1 | Cl | Cl | VNT |
| 57 | 2,6-iPr2Ph | Me | H | I | H | N | N | N | 1 | 0 | 1 | Cl | Cl | VNT |
| 58 | 2,6-iPr2Ph | Me | H | H | H | N | N | N | 1 | 0 | 1 | Cl | Cl | VNT |
| 59 | 2,6-iPr2Ph | Me | H | H | H | N | N | N | 1 | 0 | 1 | Cl | Cl | VNT |
| 60 | 2,6-iPr2Ph | H | H | F | H | N | N | N | 1 | 0 | 1 | Cl | Cl | VNT |
| 61 | 2,6-iPr2Ph | H | H | Cl | H | N | N | N | 1 | 0 | 1 | Cl | Cl | VNT |
| 62 | 2,6-iPr2Ph | H | H | Br | H | N | N | N | 1 | 0 | 1 | Cl | Cl | VNT |
| 63 | 2,6-iPr2Ph | H | H | I | H | N | N | N | 1 | 0 | 1 | Cl | Cl | VNT |
| 64 | 2,6-Me2Ph | Me | H | H | H | N | N | N | 1 | 0 | 1 | Cl | Cl | VNT |
| 65 | 2,6-Me2Ph | Me | H | F | H | N | N | N | 1 | 0 | 1 | Cl | Cl | VNT |
| 66 | 2,6-Me2Ph | Me | H | Cl | H | N | N | N | 1 | 0 | 1 | Cl | Cl | VNT |
| 67 | 2,6-Me2Ph | Me | H | B | H | N | N | N | 1 | 0 | 1 | Cl | Cl | VNT |
| 68 | 2,6-Me2Ph | Me | H | I | H | N | N | N | 1 | 0 | 1 | Cl | Cl | VNT |
| 69 | 2,6-Me2Ph | H | H | H | H | N | N | N | 1 | 0 | 1 | Cl | Cl | VNT |
| 70 | 2,6-Me2Ph | H | H | F | H | N | N | N | 1 | 0 | 1 | Cl | Cl | VNT |
| 71 | 2,6-Me2Ph | H | H | Cl | H | N | N | N | 1 | 0 | 1 | Cl | Cl | VNT |
| 72 | 2,6-Me2Ph | H | H | Br | H | N | N | N | 1 | 0 | 1 | Cl | Cl | VNT |
| 73 | 2,6-Me2Ph | H | H | I | H | N | N | N | 1 | 0 | 1 | Cl | Cl | VNT |
| 74 | 2,4,6-Me3Ph | Me | H | H | H | N | N | N | 1 | 0 | 1 | Cl | Cl | VNT |

TABLE II-continued

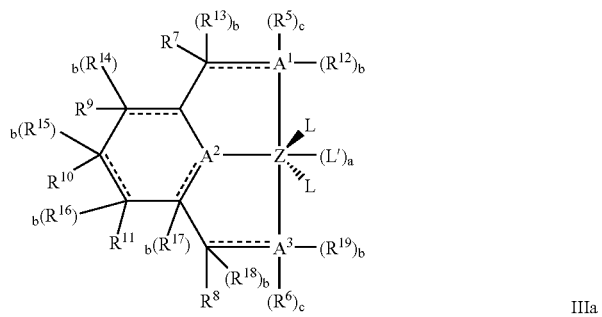

IIIa

| # | R⁵/R⁶ | R⁷/R⁸ | R⁹ | R¹⁰ | R¹¹ | A¹ | A² | A³ | a | b | c | L | L' | Z |
|---|---|---|---|---|---|---|---|---|---|---|---|---|---|---|
| 75 | 2,4,6-Me₃Ph | Me | H | F | H | N | N | N | 1 | 0 | 1 | Cl | Cl | VNT |
| 76 | 2,4,6-Me₃Ph | Me | H | Cl | H | N | N | N | 1 | 0 | 1 | Cl | Cl | VNT |
| 77 | 2,4,6-Me₃Ph | Me | H | Br | H | N | N | N | 1 | 0 | 1 | Cl | Cl | VNT |
| 78 | 2,4,6-Me₃Ph | H | H | I | H | N | N | N | 1 | 0 | 1 | Cl | Cl | VNT |
| 79 | 2,4,6-Me₃Ph | H | H | H | H | N | N | N | 1 | 0 | 1 | Cl | Cl | VNT |
| 80 | 2,4,6-Me₃Ph | H | H | F | H | N | N | N | 1 | 0 | 1 | Cl | Cl | VNT |
| 81 | 2,4,6-Me₃Ph | H | H | Cl | H | N | N | N | 1 | 0 | 1 | Cl | Cl | VNT |
| 82 | 2,4,6-Me₃Ph | H | H | Br | H | N | N | N | 1 | 0 | 1 | Cl | Cl | VNT |
| 83 | 2,4,6-Me₃Ph | H | H | I | H | N | N | N | 1 | 0 | 1 | Cl | Cl | VNT |
| 84 | 2,6-iPr₂Ph | H | H | H | H | N | N | N | 1 | 0 | 1 | Cl | Cl | MTR |
| 85 | 2,6-iPr₂Ph | H | H | F | H | N | N | N | 1 | 0 | 1 | Cl | Cl | MTR |
| 86 | 2,6-iPr₂Ph | H | H | Cl | H | N | N | N | 1 | 0 | 1 | Cl | Cl | MTR |
| 87 | 2,6-iPr₂Ph | H | H | B | H | N | N | N | 1 | 0 | 1 | Cl | Cl | MTR |
| 88 | 2,6-iPr₂Ph | H | H | I | H | N | N | N | 1 | 0 | 1 | Cl | Cl | MTR |
| 89 | 2,6-iPr₂Ph | Me | H | H | H | N | N | N | 1 | 0 | 1 | Cl | Cl | MTR |
| 90 | 2,6-iPr₂Ph | Me | H | F | H | N | N | N | 1 | 0 | 1 | Cl | Cl | MTR |
| 91 | 2,6-iPr₂Ph | Me | H | Cl | H | N | N | N | 1 | 0 | 1 | Cl | Cl | MTR |
| 92 | 2,6-iPr₂Ph | Me | H | Br | H | N | N | N | 1 | 0 | 1 | Cl | Cl | MTR |
| 93 | 2,6-iPr₂Ph | Me | H | I | H | N | N | N | 1 | 0 | 1 | Cl | Cl | MTR |
| 94 | 2,6-Me₂Ph | H | H | H | H | N | N | N | 1 | 0 | 1 | Cl | Cl | MTR |
| 95 | 2,6-Me₂Ph | H | H | F | H | N | N | N | 1 | 0 | 1 | Cl | Cl | MTR |
| 96 | 2,6-Me₂Ph | H | H | Cl | H | N | N | N | 1 | 0 | 1 | Cl | Cl | MTR |
| 97 | 2,6-Me₂Ph | H | H | B | H | N | N | N | 1 | 0 | 1 | Cl | Cl | MTR |
| 98 | 2,6-Me₂Ph | H | H | I | H | N | N | N | 1 | 0 | 1 | Cl | Cl | MTR |
| 99 | 2,6-Me₂Ph | Me | H | H | H | N | N | N | 1 | 0 | 1 | Cl | Cl | MTR |
| 100 | 2,6-Me₂Ph | Me | H | F | H | N | N | N | 1 | 0 | 1 | Cl | Cl | MTR |
| 101 | 2,6-Me₂Ph | Me | H | Cl | H | N | N | N | 1 | 0 | 1 | Cl | Cl | MTR |
| 102 | 2,6-Me₂Ph | Me | H | Br | H | N | N | N | 1 | 0 | 1 | Cl | Cl | MTR |
| 103 | 2,6-Me₂Ph | Me | H | I | H | N | N | N | 1 | 0 | 1 | Cl | Cl | MTR |
| 104 | 2,4,6-Me₃Ph | H | H | H | H | N | N | N | 1 | 0 | 1 | Cl | Cl | MTR |
| 105 | 2,4,6-Me₃Ph | H | H | F | H | N | N | N | 1 | 0 | 1 | Cl | Cl | MTR |
| 106 | 2,4,6-Me₃Ph | H | H | Cl | H | N | N | N | 1 | 0 | 1 | Cl | Cl | MTR |
| 107 | 2,4,6-Me₃Ph | H | H | B | H | N | N | N | 1 | 0 | 1 | Cl | Cl | MTR |
| 108 | 2,4,6-Me₃Ph | H | H | I | H | N | N | N | 1 | 0 | 1 | Cl | Cl | MTR |
| 109 | 2,4,6-Me₃Ph | Me | H | H | H | N | N | N | 1 | 0 | 1 | Cl | Cl | MTR |
| 110 | 2,4,6-Me₃Ph | Me | H | F | H | N | N | N | 1 | 0 | 1 | Cl | Cl | MTR |
| 111 | 2,4,6-Me₃Ph | Me | H | Cl | H | N | N | N | 1 | 0 | 1 | Cl | Cl | MTR |
| 112 | 2,4,6-Me₃Ph | Me | H | Br | H | N | N | N | 1 | 0 | 1 | Cl | Cl | MTR |
| 113 | 2,4,6-Me₃Ph | Me | H | I | H | N | N | N | 1 | 0 | 1 | Cl | Cl | MTR |

NA = Not Applicable
VNT = V, Nb, or Ta
MTR = Mn, Tc, or Re

The asterisk (*) in Table II above represents both anionic ligand groups (L) of the above preferred tridentate compounds II(a) and for each of the above compounds both L groups are, respectively, chlorine; bromine; methyl (—CH₃); ethyl (—C₂H₅); propyl (—C₃H₅, each of the isomers); butyl (—C₄H₉, each of the isomers); dimethylamine; 1,3-butadiene-1,4 diyl; 1,4-pentadiene-1,5 diyl; C₄ alkylene; and C₅ alkylene. Also in Table II, B$_z$=benzyl; Sil=siloxyl; iPrPh=isopropylphenyl; t-Bu=tert-butyl; Me₂=dimethyl, Me₃=trimethyl, etc.

The transition metal complex or complexes used to provide the present catalyst composition is introduced into the mixture in an amount to provide from 1 to about 1000 (preferably from 5 to 500 and most preferably from about 10 to about 100) μmol of transition metal per gram of inorganic oxide used.

As stated above, the present active catalyst composition is formed by mixing the components described above in certain related amounts. The aluminum compound to be used in the present invention is a non-alumoxane compound defined according to Formula I above. This aluminum compound is made part of the mixture in a ratio of from 0.001 to 2.1 mmol of Al per gram of inorganic oxide used. Preferably from about 0.01 to 1.9, more preferably from about 0.01 to 1.5 and most preferably from about 0.01 to 1 mmol Al per gram of inorganic oxide used. Further, the transition metal complex described above which is used to provide the present catalyst composition is used in from 1 to 1000 μmole of transition metal (preferably from 5 to 500 and most preferably from about 10 to 100 μmole) per gram of inorganic oxide. Finally, the mole ratio of aluminum to transition metal should be within the range of from 1:1 to 75:1 with from 1:1 to 50:1 being preferred and from 1:1 to 25:1 being still more preferred and from 1:1 to 20:1 being most preferred.

It has been unexpected found that the above-described aluminum compound, inorganic oxide and at least one bidentate or tridentate ligand/transition metal complex can be formed into a polymerization catalyst composition by a single-step process. This process merely requires the mixing of the three components together in a single stage reaction vessel. Alternatively, when the aluminum compound is used to initially act as a scavenger for the polymerization reaction vessel, the inorganic oxide and transition metal complex can be introduced together into the reaction vessel to provide the catalyst composition.

The mixing of the components of the present catalyst composition can be readily accomplished by introducing the components into an inert (to chemical reaction with the components I, II and III) liquid such as a hydrocarbon liquid, preferably a $C_5$-$C_{10}$ aliphatic or cycloaliphatic hydrocarbon or a $C_6$-$C_{12}$ aromatic or alkyl substituted aromatic hydrocarbon. The components are introduced into the liquid and maintained therein under agitation and at low temperature and pressure conditions. The concentration of the Components I, II and III can very greatly, but preferably is from 0.1 to 25 wt. percent, more preferably from 0.5 to 20 wt. percent and most preferably from 1 to 15 wt. percent. The temperature may range from 0° to about 75° C. with from 0° to 50° being preferred and from 10° to about 35° C. being most preferred. The components can be contacted at reduced, atmospheric or elevated pressure, with atmospheric pressure being preferred. Ambient conditions are preferred. The atmospheric condition of the reaction zone should preferably be substantially anaerobic and anhydrous.

The components are mixed for a period, preferably from 0.5 minute to 60 minutes (more preferably from 1 to 10 minutes), to provide a substantially uniform mixed catalyst composition. The formed mixture can remain as a slurry or be separated from the inert liquid, by filtration, vacuum distillation or the like to provide a solid catalyst composition. This composition should be stored under anaerobic conditions until being introduced into a polymerization reaction zone for use in forming polyolefin products. The resultant catalyst composition is storage stable for about 3 to 6 months or longer.

The Components I, II and III can be introduced into the inert liquid in any order or substantially simultaneously. It is preferred that, when the components are introduced sequentially, they are introduced in rapid order; that is, without a substantial period of delay between each components introduction. When sequential introduction is conducted, it is preferred that the components be added in the sequence of Component I, then Component II followed by Component III.

Alternately, the mixture of Components I, II and III in the inert liquid can be used directly as a polymerization catalyst composition. Thus, the present catalyst composition can be formed by the single-step of mixing the readily available components in an inert liquid and then directly transferring the formed liquid dispersion to the polymerization reaction zone. In this embodiment, the inert liquid used to form the dispersion should be chosen from those liquids which are miscible with the liquids used in the polymerization reaction zone and which are inert with respect to the solvents, monomer(s) and polymer products contemplated.

The present polymerization catalyst composition can be formed in situ in the polymerization reaction zone. The aluminum compound can be introduced neat or as a solution in an inert liquid, which may be the same liquid as that of the polymerization media. The other components may be introduced into the polymerization zone either as solids or as slurries in inert liquids. In all cases, the liquid(s) used to introduce the components forming the present catalyst composition should be missible with the liquid used as the polymerization media.

The Components I, II and III may be introduced into the polymerization zone in any order or simultaneously (preferred). If introduced sequentially, it is preferred that they be introduced in rapid order; that is, without a substantial period of delay between each components introduction. In certain instances, excess aluminum compound may be introduced first and used as a scavenger agent prior to formation of the polymerization catalyst. The small excess over the needed to scavenge will provide the Component I of the subject composition. In batch polymerization processes, the components forming the present catalyst composition may be introduced prior to, concurrently with or subsequent to the introduction of the olefinic monomer feed. It has been found that the present catalyst composition forms rapidly under normal polymerization conditions to exhibit high catalytic activity, to provide high molecular polymer product and to yield a polymer with superior morphology, without reactor fouling.

It is believed, though no meant to be a limitation on the subject invention, that the aluminum compound described herein reacts with a hydroxyl group present on the surface of the inorganic oxide to form a group having a single aluminum atom which has two substituents pendant therefrom. In the case where the bound aluminum atom has hydrocarbyl substituents and the transition metal has halogen labile groups (L), these groups may exchange to provide a halo substituted aluminum atom with the hydrocarbyl group(s) becoming associated with the transition metal. The halogen substituted aluminum group may have sufficient Lewis acidity with respect to the bidentate or tridentate compound to extract one of the transition metal associated groups and thereby provide an active catalytic specie. Alternately, if the subject composition is formed with a transition metal bidentate or tridentate which has hydrocarbyl labile group(s) (L), the aluminum moiety, once bound to the silica, may exhibit sufficient Lewis acidity to extract the labile hydrocarbyl group to provide the cationic active catalyst specie. Whatever the mechanism of the present mixture, it is believed that it does not entail the presence of an oligomeric and/or polymeric aluminoxane activator nor the separate formation of same to provide the formation of the present catalyst composition.

The catalyst composition of the present invention can be used in addition polymerization processes wherein one or more monomers are contacted with the heterogeneous catalyst composition (either in its original inert liquid or as separated solid product, as described above) introduced into the polymerization zone under addition polymerization conditions.

Suitable addition polymerizable monomers include ethylenically unsaturated monomers, acetylenic compounds, conjugated or non-conjugated dienes, and polyenes. Preferred monomers include olefins, for example alpha-olefins having from 2 to 20,000, preferably from 2 to 20, more preferably from 2 to 8 carbon atoms and combinations of two or more of such alpha-olefins. Particularly suitable alpha-olefins include, for example, ethylene, propylene, 1-butene, 1-pentene, 4-methylpentene-1, 1-hexene, 1-heptene, 1-octene, 1-nonene, 1-decene, 1-undecene, 1-dodecene, 1-tridecene, 1-tetradecene, 1-pentadecene or combinations thereof, as well as long chain vinyl terminated oligomeric or polymeric reaction products formed during the polymerization and $C_{10\text{-}30}$ α-olefins specifically added to the reaction mixture in order to produce relatively long chain branches in the resulting polymers. Preferably, the alpha-olefins are ethylene, propylene, 1-butene, 4-methyl-pentene-1, 1-hexene, 1-octene, and combinations of ethylene and/or propylene with one or more of such other alpha-olefins. The most preferred is ethylene alone or with other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixture of the above-mentioned monomers may also be employed.

In addition, the polymerization monomers may include functionalized ethylenically unsaturated monomers wherein the functional group is selected from hydroxyl, carboxylic acid, carboxylic acid esters, acetates, ethers, amides, amines and the like.

The present heterogeneous catalyst composition can be advantageously employed in a high pressure, solution, slurry or gas phase polymerization process. For example, polymerization of monomers can be carried out in the gas phase by fluidizing, under polymerization conditions, a bed comprising the target polyolefin powder an particulate of catalyst composition using a fluidizing gas stream comprising gaseous monomer. In a solution process the (co)polymerization is conducted by introducing the monomer into a solution or suspension of the catalyst composition in a liquid hydrocarbon under conditions of temperature and pressure such that the produced polyolefin forms as a solution in the hydrocarbon diluent. In the slurry process, the temperature, pressure and choice of diluent are such that the produced polymer forms as a suspension in a liquid hydrocarbon diluent. Because the present catalyst composition is formed by a one step process in a liquid media, it can be directly transferred and used in solution and slurry processes.

The polymerization of olefins are generally conducted at relatively low pressures of from about 1 to 100, preferably 10 to 50 bar and low temperature of from about −30 to 450° C., preferably from about 50° to 150° C.

It has unexpectedly been found that the present catalyst composition can exhibit, when formed in the manner described herein, very high catalytic activity. For example, catalytic activity of from about 300 to 6000 grams and higher of polyolefin per gram of catalyst per hour, is commonly achieved. This activity is several fold higher than achieved when using the same transition metal bidentate or tridentate compound in systems comprising silica and aluminoxane (MAO) for the heterogeneous polymerization of the same monomer. (See, for example, WO 98/27124 and WO 98/12981.)

In addition, the present one step precess can be formed and used without the need for filtration and separation, and without the need for multi-step formation of the active composition. Further, the liquid used in the catalyst formation can be readily recycled for further production of catalyst and/or used as part of the polymerization liquid medium.

The following examples are given as specific illustrations of the claimed invention. It should be understood, however, that the invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, carbon number, conditions, physical states or percentages, is intended to literally incorporate expressly herein any number falling within such range, including any subset of numbers within any range so recited.

EXAMPLES

A. General Catalyst Preparation Procedures

A suspension was formed by introducing to 25 parts of toluene (i) an aliquot of Al $^i$Bu$_3$ in toluene (1 M of Al$^i$Bu$_3$ in toluene from Aldrich Chemical) to provide the specific amounts indicated in the Tables of the Examples below, (2) solid tridentate ligand/transition metal complex in the specific amounts indicated in the Tables of the Examples below and (3) 1 part solid inorganic oxide particulate. The components were added under an argon atmosphere at room temperature (RT). (The symbol $^i$Bu represents isobutyl throughout the examples). The resulting suspension was then sealed, agitated and stored in an argon-filled drybox. The values given in each Table herein below relative to Component I, II and II is with respect to amounts used to form the catalyst composition.

B. Polymerization Method

The polymerization results shown below were carried out in a 2-liter autoclave reactor, which was evacuated at the pre-set reaction temperature for 90 min prior to use.

An alkyl aluminum (200 μmole Al$^i$Bu$_3$ in toluene) was used to pretreat and scavenge a heptane (~350 ml) solution which was then mixed with a 0.7 part aliquot of the catalyst reaction slurry, as mentioned in A above. Subsequently, the resulting catalyst mixture was injected to the reactor. While the reactor agitator was stirring at 500 rpm, ethylene and hydrogen were quickly admitted to the reactor and the reactor pressure was set at desired polymerization pressure (typically at 200 psig). Ethylene was fed on demand via a mass flow controller. All the polymerizations were carried out for 1 h. The polymerization temperature (70° C.) was controlled via a recirculating water bath. After the polymerization, the ethylene gas was shut off and the reaction temperature was cooled to RT. The resulting PE slurry was filtered, washed with MeOH and acetone, and the PE was dried in a vacuum oven at ~50° C. for at least 3 h. Unless mentioned otherwise, there was no reactor fouling observed.

C. Catalyst Composition and Performance

Example 1

The following Table 1 below displays the catalyst composition (Al$^i$Bu$_3$ and Fe tridentate compound loadings) and performance (i.e. catalyst activity, Fe metal efficiency, and bulk density of the resulting polymer particles). The catalysts listed in Table 1 below were prepared by adding Grace Davison 955 silica (10 μm, 300 m$^2$/g, 1.6 cc/g, 3.5% TV @ 1750° F.), Al$^i$Bu$_3$ solution (1 M in toluene), and a tridentate ligand/transition metal complex, 2,6-bis(2,4,6-trimethylarylimino)pyridyl iron dichloride. These components were added sequentially into a 25 ml toluene solution under argon atmosphere in the manner described in Section A above. The Al$^i$Bu$_3$ and Fe compound loadings were based on per gram of silica in the 25-ml toluene solution. A portion of this catalyst slurry was then used for polymerization testing according to the polymerization method described in Section B above. The polymerization conditions were at 70° C., 200 psig and the $H_2$/ethylene ratio was ~0.05.

TABLE 1

| Cat # | Al$^i$Bu$_3$ mmol/g SiO$_2$ | Fe[†] μmol/g SiO$_2$ | Al/Fe mol/mol | Cat Act g/gCat-h[2] | Fe Act g/gFe-h[3] | BD[1] g/cc |
|---|---|---|---|---|---|---|
| 1 | 0.5 | 76.3 | 6.6 | 2,930 | 6.9E05[4] | 0.29 |
| 2 | 1 | 76.3 | 13.1 | 5,910 | 1.4E06 | 0.32 |
| 3 | 2 | 76.3 | 26.2 | 400 | 9.0E05 | na |
| 4 | 0.5 | 57.3 | 8.7 | 3,040 | 9.5E05 | 0.32 |
| 5 | 1 | 57.3 | 17.5 | 3,400 | 1.1E06 | 0.34 |

[†]2,6-bis(2,4,6-trimethylarylimino)pyridyl iron dichloride, loading (μmol) per gram of silica.
[1]BD = bulk density of polymer product
[2]gram of polymer/gram of catalyst/hour
[3]gram of polymer/gram of iron/hour
[4]6.9E05 = 6.9 × 10$^5$ The results of Table 1 illustrates that the subject catalyst composition exhibits high catalytic activity and that this activity drops sharply when the concentration of aluminum alkyl component approached the upper limit (See Catalyst No. 3 of Table 1).

Example 2

The same catalyst preparation and polymerization conditions as in Example 1 was followed, but in this case different aluminum alkyls (AlMe$^3$ AlEt$_3$ and Al$^i$Bu$_3$) were employed. Table 2 below outlines the performance of these catalyst systems.

TABLE 2

| Cat. # | AlR$_3$ | AlR$_3$ mmol/g SiO$_2$ | Fe[†] μmol/g SiO$_2$ | Al/Fe mol/mol | Cat Act g/gCat-h | Fe Act g/gFe-h | B.D g/cc |
|---|---|---|---|---|---|---|---|
| 1 | R = Me | 1.0 | 76.3 | 13.1 | 2,590 | 6.1E05 | 0.28 |
| 2 | R = Et | 1.0 | 76.3 | 13.1 | 2,810 | 6.6E05 | 0.29 |
| 3 | R = $^i$Bu | 1.0 | 76.3 | 13.1 | 5,910 | 1.4E06 | 0.32 |

The results of Table 2 illustrate that the catalytic activity will vary depending on the particular components used. In the above instances, the activity and the bulk density increased with use of higher alkyl substituted aluminum compounds.

Example 3

The catalyst compositions and polymerization conditions were the same as those of Example 1 except that different silicas were used in this example. The silicas used for the following examples were based on Grace Davison SP9-263 silica (10 or 20 μ, 500 m$^2$/g, 1.5 cc/g, 8.6 or 2.9% TV @1750° F.). The results are given in Table 3 below.

TABLE 3

| Cat # | Size μ | TV % | Al$^i$Bu$_3$ mmol/g | Fe μmol/g | Al/Fe mol/mol | Cat Act g/gCat-h | Fe Act g/gFe-h | BD g/cc |
|---|---|---|---|---|---|---|---|---|
| 1 | 10 | 8.6 | 1 | 76.3 | 13.1 | 3,460 | 8.1E05 | 0.36 |
| 2 | 10 | 8.6 | 1 | 57.3 | 17.5 | 1,670 | 5.2E05 | 0.31 |
| 3 | 20 | 2.9 | 1 | 114.5 | 8.7 | 4,890 | 1.2E06 | 0.36* |
| 4 | 20 | 2.9 | 1 | 57.3 | 17.5 | 2,700 | 8.5E05 | 0.33 |
| 5 | 20 | 2.9 | 0.5 | 57.3 | 8.7 | 2,650 | 8.3E05 | 0.34 |

*Polyethylene product Mw = 300,000 Mw/Mn = 10.0

The results of Table 3 illustrate that the total volatile content (TV) of the silica used did not aid in the activity of the formed catalyst composition. The higher TV silicas used in catalyst 1 and 2 actually provided catalyst compositions with lower activity when compared to the back-to-back example (see Catalyst 2 and 4 of Table 3).

Further, Catalysts 3, 4 and 5 were further dried to provide very low TV of only 2.9% yet these samples produce catalyst compositions exhibiting very high activity even though the particle size of the silica was substantially larger than Catalyst 1 and 2 (smaller particle size normally yields higher activity).

Finally, Catalyst 4 and 5 of Table 3 illustrates that lower amounts of aluminum compound did not detract from the resultant product. On the contrary, Catalyst 5 had similar activity and produced a polymer of even higher bulk density (BD) than that of Catalyst 4.

Example 4

Table 4 shows catalyst prepared by mixing Al$^i$Bu$_3$ (1 M in toluene), tridentate ligand/transition metal complex, 2,6-bis (2,4,6-trimethylarylimino)pyridyl iron dichloride, and Grace Davison loose aggregate silica (28 or 47 μ) in a toluene solution (25 ml) at RT according to the procedure described in Section A above. The resulting solutions were capped, agitated, and stored under argon atmosphere.

TABLE 4

| Cat # | Silica | Al$^i$Bu$_3$ mmol/g | Fe μmol/g | Al/Fe mol/mol | Cat Act g/gCat-h | Fe Act g/gFe-h | BD g/cc |
|---|---|---|---|---|---|---|---|
| 1 | I | 0.5 | 57.3 | 8.7 | 3,550 | 1.1E06 | 0.38 |
| 2 | I | 0.3 | 57.3 | 5.2 | 4,210 | 1.3E06 | 0.37 |
| 3 | II | 1 | 57.3 | 17.5 | 3,620 | 1.1E06 | 0.30 | a. Silica I: 2.5% TV, 28μ particle size, 300 m$^2$/g surface area, and 1.5 cc/g pore volume.
b. Silica II: 8.8% TV, 47μ particle size, 277 m$^2$/g surface area, and 1.68 cc/g pore volume.

The results of Table 4 provides the following illustrative teachings:
 a) When Catalyst 1 of Table 4 is compared to Catalyst 5 of Table 3, one again sees that the lower the amount of TV in the silica, the higher the catalytic activity, and production of polymer of higher BD without reactor fouling.
 b) When Catalyst 1 and Catalyst 2 of Table 4 are compared, one against sees that very low amounts of aluminum compound provides high activity.

Example 5

The following catalyst mixture was prepared by using a similar catalyst preparation procedure as described in Example 4 except that the silica was replaced by alumina. This 42 μ alumina had a surface area of 359 m$^2$/g and the pore volume (PV) is 1.10 cc/g.

TABLE 5

| Run # | Al$^i$Bu$_3$ mmol/g-Al$_2$O$_3$ | Fe$^+$ μmol/g-Al$_2$O$_3$ | Cat Act g/gCat-h | Fe Act g/gFe-h | PE g | HLMI g/10 min |
|---|---|---|---|---|---|---|
| 1 | 2.0 | 76.3 | 660 | 1.5E05 | 20* | 4.5 |

*Polymer Tm = 135.7° C.

Comparative Example 1

The catalyst reaction slurry was prepared by the addition of isobutylaluminoxane (3.66 ml; 1 mmole; 0.273 M in toluene solution, Akzo Chemical) to a toluene solution (25 ml). This toluene diluted isobutylaluminoxane solution was then reacted with 2,6-bis(2,4,6-trimethylarylimino)pyridyl iron dichloride (40 mg; 76.3 µmole). An aliquot of this resulting solution (1 and 3 ml) was then used for polymerizations (70° C. and 200 psig; H$_2$/ethylene=0.0530).

TABLE 6

| Run # | IBAO* loading Al/Fe Molar Ratio | Cat Loading‡ Fe µmol | Fe Activity gPE/gFe-h |
|---|---|---|---|
| 1 | 13.2 | 2.7 | 0 |
| 2 | 13.2 | 8 | 7.3E04 |

*IBAO = Isobutylaluminoxane
‡µmol of Fe used for ethylene polymerization.

The 1 ml aliquot containing 2.7 µmol Fe was not enough to initiate the polymerization (70° C. and 200 psig; H2/═C$_2$=0.053) and there was no polymerization activity. Only small amount (32.6 g) of polymer "sheets" (undefined polymer morphology) was obtained when the catalyst loading was increased by 3-fold (3 ml aliquot=8 µmol Fe pre-catalyst).

This Comparative Example utilized an aluminoxane in lieu of the aluminum compound required by the present invention. These samples, when compared to Catalyst 1 of Table 3, formed from the same Components II and III and Al$^i$Bu$_3$ in the same Al/Fe ratio, supports the premise that an aluminoxane is not formed nor does it provide activation to achieve a catalyst composition of high activity. Catalyst 1 of Table 3 illustrates a catalyst composition of very high activity suitable to produce a polymer product of high BD without fouling. In contrast Runs 1 and 2 of Table 6 show that IBAO activated catalyst at same Al/Fe ratio had no or very low activity.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art, without departing from the spirit of the invention.

The invention claimed is:

1. A catalyst composition useful in the polymerization of olefins formed by contacting substantially simultaneously in a single reaction zone and in an inert liquid, the components comprising:
   a) aluminum compounds selected from at least one aluminum compound represented by the formula

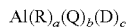

wherein
   R is a hydrocarbyl group;
   Q is a hydrocarbyloxy group;
   D is hydrogen or halogen;
   and each a, b, c is an integer of 0-3 provided the sum of a+b+c is 3;
   b) an inorganic oxide having from 0.01 to 12 mmole/gram of surface hydroxyl groups; and
   c) a precatalyst selected from at least one transition metal compound selected from the group consisting of a bidentate ligand/transition metal complex, a tridentate ligand/transition metal complex and mixtures thereof and wherein the transition metal of said complex is Fe, Co, Ni, Ru, Rh, Pd, Os, Ir, Pt, Ti, Zr or Hf; said components being present in amounts to provide 0.001 to 2.1 mmol of aluminum and from 1 to 1000 µmol of transition metal per gram of inorganic oxide and a mole ratio of aluminum of component a) to transition metal of component c) of from 1:1 to 25:1.

2. The catalyst composition of claim 1 wherein the precatalyst is a transition metal compound comprising at least one bidentate ligand/transition metal complex represented by the formula

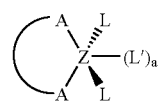

wherein
   i) each A independently represents an oxygen, sulfur, phosphorus or nitrogen atom of the bidentate ligand;
   ii) Z represents a transition metal selected from the group consisting of Fe, Co, Ni, Ru, Rh, Pd, Os, Ir and Pr in the +2 or +3 oxidation state and Ti, Zr and Hf in the +2, +3 or +4 oxidation state;
   iii) each L and L' independently represents a ligand group selected from the group consisting of hydrogen, halogen, and unsubstituted or a substituted hydrocarbon radical or both L, together with Z, represents a C$_3$-C$_{24}$ hydrocarbylene metallocyclic structure; and
   (iv) "a" of (L'), is an integer of 0, 1 or 2 to provide a neutral transition metal complex.

3. The catalyst composition of claim 1 wherein the precatalyst is a transition metal compound comprising at least one tridentate ligand/transition metal complex represented by the formula

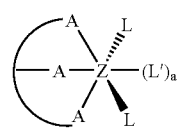

wherein
   i) each A independently represents an oxygen, sulfur, phosphorous or nitrogen atom of the tridentate ligand;
   ii) Z represents a transition metal selected from the group consisting of Fe, Co, Ni, Ru, Rh, Pd, Os, Ir and Pt in the +2 or +3 oxidation state and Ti, Zr, and Hf in the +2, +3 or +4 oxidation state;
   iii) each L and L' independently represents a ligand group selected from the group consisting of hydrogen, halogen, an unsubstituted or a substituted hydrocarbon radical or both L, together with Z represents a C$_3$-C$_{24}$ hydrocarbylene metallocyclic structure; and
   iv) "a" of (L'), is an integer of 0, 1 or 2 to provide a neutral transition metal complex.

4. The catalyst composition of claim 2 or 3 wherein each A represents a nitrogen atom, each L and L' is independently a halogen atom, or a hydrocarbyl or mixtures thereof or both L together form an hydrocarbylene metallocyclic group which, with Z, forms a 3 to 7 member ring structure.

5. The catalyst composition of claim 2 or 3 wherein "a" of the aluminum compound is 1 to 3 and each L of the transition metal compound is a halogen atom.

6. The catalyst composition of claim 2 or 3 wherein at least one L of the transition metal complex is hydrocarbyl.

7. The catalyst of claim 1 wherein Z is Ni, Pd, Fe or Co.

8. The catalyst composition of claim 2 wherein Z is Ni or Pd and each L is independently chlorine, bromine, iodine or a $C_1$-$C_8$ alkyl group.

9. The catalyst composition of claim 3 wherein Z is iron or cobalt and each L is independently chlorine, bromine, iodine or a $C_1$-$C_8$ alkyl group.

10. The catalyst composition of claim 1 wherein "a" of the aluminum compound is 3.

11. The catalyst composition of claim 2 wherein "a" of the aluminum compound is 3.

12. The catalyst composition of claim 3 wherein "a" of the aluminum compound is 3.

13. The catalyst composition of claim 4 wherein "a" of the aluminum compound is 3.

14. The catalyst composition of claim 1 wherein the transition metal is Fe.

15. The catalyst composition of claim 2 wherein the transition metal is Fe.

16. The catalyst composition of claim 3 wherein the transition metal is Fe.

17. The catalyst composition of claim 10, 11 or 12 wherein the transition metal is Fe.

18. The catalyst composition of claim 1 wherein the inorganic oxide has a total volatile content of 0.1 to about 4 weight percent, surface hydroxyl groups of from 0.1 to 5 mmol/g and a surface area of from 10 to 1000 m²/g.

19. The catalyst composition of claim 10 wherein the inorganic oxide has a total volatile content of 0.1 to about 4 weight percent, surface hydroxyl groups of from 0.1 to 5 mmol/g and a surface area of from 10 to 1000 m²/g.

20. The catalyst composition of claim 11 wherein the inorganic oxide has a total volatile content of 0.1 to about 4 weight percent, surface hydroxyl groups of from 0.1 to 5 mmol/g and a surface area of from 10 to 1000 m²/g.

21. The catalyst composition of claim 12 wherein the inorganic oxide has a total volatile content of 0.1 to about 4 weight percent, surface hydroxyl groups of from 0.1 to 5 mmol/g and a surface area of from 10 to 1000 m²/g.

22. The catalyst composition of claim 13 wherein the inorganic oxide has a total volatile content of 0.1 to about 4 weight percent, surface hydroxyl groups of from 0.1 to 5 mmol/g and a surface area of from 10 to 1000 m²/g.

23. The catalyst composition of claim 14 wherein the inorganic oxide has a total volatile content of 0.1 to about 4 weight percent, surface hydroxyl groups of from 0.1 to 5 mmol/g and a surface area of from 10 to 1000 m²/g.

24. The catalyst composition of claim 15 wherein the inorganic oxide has a total volatile content of 0.1 to about 4 weight percent, surface hydroxyl groups of from 0.1 to 5 mmol/g and a surface area of from 10 to 1000 m²/g.

25. The catalyst composition of claim 16 wherein the inorganic oxide has a total volatile content of 0.1 to about 4 weight percent, surface hydroxyl groups of from 0.1 to 5 mmol/g and a surface area of from 10 to 1000 m²/g.

26. The catalyst composition of claim 17 wherein the inorganic oxide has a total volatile content of 0.1 to about 4 weight percent, surface hydroxyl groups of from 0.1 to 5 mmol/g and a surface are of from 10 to 1000 m²/g.

27. The composition of claim 1, 10, 11, 12 or 18 wherein the inorganic oxide is silica and the transition metal is Fe.

28. The catalyst composition of claim 1, 10 or 18 wherein said aluminum compound is present in an amount to provide from about 0.01 to 1.9 mmol of Al per gram of inorganic oxide; said transition metal complex is present in an amount to provide from 5 to 500 moles of transition metal per gram of inorganic oxide and said aluminum to transition metal is in a molar ratio of 1:1 to 20:1.

29. The catalyst composition of claim 27 wherein said aluminum compound is present in an amount to provide from about 0.01 to 1.9 mmol of Al per gram of inorganic oxide; said transition metal complex is present in an amount to provide from 5 to 500 moles of transition metal per gram of inorganic oxide and said aluminum to transition metal is in a molar ratio of 1:1 to 20:1.

30. The catalyst composition of claim 1, 2, 3, 7, 8, 9, 10, 11, 12, 16, 18, 19, 20 or 21 wherein the components are sequentially introduced into the inert liquid in the order of first component a), followed by component b), and then followed by component c) and recovering a solid mixture from the liquid.

31. The catalyst composition of claim 4 wherein the components are introduced into the inert liquid in the order of first component a), followed by component b), and then followed by component c) and recovering a solid mixture from the liquid.

32. The catalyst composition of claim 5 wherein the components are introduced into the inert liquid in the order of first component a), followed by component b), and then followed by component c) and recovering a solid mixture from the liquid.

33. The catalyst composition of claim 6 wherein the components are introduced into the inert liquid in the order of first component a), followed by component b), and then followed by component c) and recovering a solid mixture from the liquid.

34. The catalyst composition of claim 13 wherein the components are introduced into the inert liquid in the order of first component a), followed by component b), and then followed by component c) and recovering a solid mixture from the liquid.

35. The catalyst composition of claim 14 wherein the components are introduced into the inert liquid in the order of first component a), followed by component b), and then followed by component c) and recovering a solid mixture from the liquid.

36. The catalyst composition of claim 15 wherein the components are introduced into the inert liquid in the order of first component a), followed by component b), and then followed by component c) and recovering a solid mixture from the liquid.

37. The catalyst composition of claim 22 wherein the components are introduced into the inert liquid in the order of first component a), followed by component b), and then followed by component c) and recovering a solid mixture from the liquid.

38. The catalyst composition of claim 23 wherein the components are introduced into the inert liquid in the order of first component a), followed by component b), and then followed by component c) and recovering a solid mixture from the liquid.

39. The catalyst composition of claim 24 wherein the components are introduced into the inert liquid in the order of first component a), followed by component b), and then followed by component c) and recovering a solid mixture from the liquid.

40. The catalyst composition of claim 27 wherein the components are introduced into the inert liquid in the order of first component a), followed by component b), and then followed by component c) and recovering a solid mixture from the liquid.

41. The catalyst composition of claim 1, 2, 3, 7, 8, 9, 10, 11, 12, 16, 18, 19, 20 or 21 wherein components a), b) and c) are concurrently introduced into the inert liquid and maintained therein a temperatures of from 0° to 50° C. and atmospheric pressure.

42. The catalyst composition of claim 4 wherein components a), b) and c) are concurrently introduced into the inert liquid and maintained therein at temperatures of from 0° to 50° C. and atmospheric pressure.

43. The catalyst comoposition of claim 5 wherein components a), b) and c) are concurrently introduced into the inert liquid and maintained therein at temperatures of from 0° to 50° C. and atmospheric pressure.

44. The catalyst composition of claim 13 wherein components a), b) and c) are concurrently introduced into the inert liquid and maintained therein at temperatures of from 0° to 50° C. and atmospheric pressure.

45. The catalyst composition of claim 14 wherein components a), b) and c) are concurrently introduced into the inert liquid and maintained therein at temperatures of from 0° to 50° C. and atmospheric pressure.

46. The catalyst composition of claim 15 wherein components a), b) and c) are concurrently introduced into the inert liquid and maintained therein at temperatures of from 0° to 50° C. and atmospheric pressure.

47. The catalyst composition of claim 22 wherein components a), b) and c) are concurrently introduced into the inert liquid and maintained therein at temperatures of from 0° to 50° C. and atmospheric pressure.

48. The catalyst composition of claim 23 wherein components a), b) and c) are concurrently introduced into the inert liquid and maintained therein at temperatures of from 0° to 50° C. and atmospheric pressure.

49. The catalyst composition of claim 24 wherein components a), b) and c) are concurrently introduced into the inert liquid and maintained therein a temperatures of from 0° to 50° C. and atmospheric pressure.

50. The catalyst composition of claim 27 wherein components a), b) and c) are concurrently introduced into the inert liquid and maintained therein at temperatures of from 0° to 50° C. and atmospheric pressure.

51. The catalyst composition of claim 1, 2, 3, 7, 8, 9, 10, 11, 12, 16, 18, 19, 20 or 21 wherein the components a), b) and c) are directly introduced into an olefin polymerization reaction zone.

52. The catalyst composition of claim 4 wherein the components a), b) and c) are directly introduced into an olefin polymerization reaction zone.

53. The catalyst composition of claim 5 wherein the components a), b) and c) are directly introduced into an olefin polymerization reaction zone.

54. The catalyst composition of claim 6 wherein the components a), b) and c) are directly introduced into an olefin polymerization reaction zone.

55. The catalyst composition of claim 13 wherein the components a), b) and c) are directly introduced into a olefin polymerization reaction zone.

56. The catalyst composition of claim 14 wherein the components a), b) and c) are directly introduced into an olefin polymerization reaction zone.

57. The catalyst composition of claim 15 wherein the components a), b) and c) are directly introduced into an olefin polymerization reaction zone.

58. The catalyst composition of claim 22 wherein the components a), b) and c) are directly introduced into an olefin polymerization reaction zone.

59. The catalyst composition of claim 23 wherein the components a), b) and c) are directly introduced into an olefin polymerization reaction zone.

60. The catalyst composition of claim 24 wherein the components a), b) and c) are directly introduced into an olefin polymerization reaction zone.

61. The catalyst composition of claim 27 wherein the components a), b) and c) are directly introduced into an olefin polymerization reaction zone.

62. The catalyst composition of claim 14, 15 or 16 wherein "a" of the aluminum compound is 3.

63. A heterogeneous catalyst composition useful in the polymerization of olefins comprising a mixture of:
  a) aluminum compounds selected from at least one aluminum compound represented by the formula:

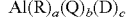

$Al(R)_a(Q)_b(D)_c$ wherein
  R is a hydrocarbyl group;
  Q is a hydrocarbyloxy group;
  D is a hydrogen or halogen;
  and each a, b, c is an integer of 0-3 provided the sum of a+b+c is 3;
  b) an inorganic oxide having from 0.01 to 12 mmole/gram of surface hydroxyl groups; and
  c) a precatalyst selected from at least one transition metal compound selected from the group consisting of a bidentate ligand/transition metal complex, a tridentate ligand/transition metal complex and mixtures thereof and wherein the transition metal of said complex is Fe, Co, Ni, Ru, Rh, Pd, Os, Ir, Pt, Ti, Zr or Hf; said components being present in amounts to provide 0.001 to 2.1 mmol of aluminum and from 1 to 1000 μmol of transition metal per gram of inorganic oxide and a mole ratio of aluminum to transition metal of from 1:1 to 25:1.

64. The catalyst composition of claim 63 wherein the transition metal compound is a bidentate ligand/transition metal complex represented by the formula

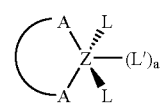

II wherein
  i) each A independently represents an oxygen, sulfur, phosphorus or nitrogen atom of the bidentate ligand;
  ii) Z represents a transition metal selected from the group consisting of Fe, Co, Ni, Ru, Rh, Pd, Os, Ir and Pt in the +2 or +3 oxidation state and Ti, Zr and Hf in the +2, +3 or +4 oxidation state;
  iii) each L and L' independently represents a ligand group selected from the group consisting of hydrogen, halogen, an unsubstituted or a substituted hydrocarbon radical or both L, together with Z, represents a $C_3$-$C_{24}$ hydrocarbylene metallocyclic structure; and
  iv) "a" of (L'), is an integer of 0, 1 or 2 to provide a neutral transition metal complex.

65. The catalyst composition of claim 63 wherein the transition metal compound is a tridentate ligand/transition metal complex represented by the formula

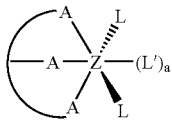

wherein
- i) each A independently represents an oxygen, sulfur, phosphorous or nitrogen atom of a tridentate ligand;
- ii) Z represents a transition metal selected from the group consisting of Fe, Co, Ni, Ru, Rh, Pd, Os, Ir and Pt in the +2 or +3 oxidation state and Ti, Zr, and Hf in the +2, +3 or +4 oxidation state;
- iii) each L and L' independently represents a ligand group selected from the group consisting of hydrogen, halogen, and unsubstituted or a substituted hydrocarbon radical or both L, together with Z represents a $C_3$-$C_{24}$ hydrocarbylene metallocyclic structure; and
- iv) "a" of (L'), is an integer of 0, 1 or 2 to provide a neutral transition metal complex.

66. The catalyst composition of claim 64 or 65 wherein each A represents a nitrogen atom, each L and L' is independently a halogen atom, or a hydrocarbyl or mixtures thereof or both L together form a hydrocarbylene metallocyclic group which, with Z, forms a 3 to 7 member ring structure.

67. The catalyst composition of claim 64 or 65 wherein "a" of the aluminum compound is 1 to 3 and each L of the transition metal compound is a halogen atom.

68. The catalyst composition of claim 64 or 65 wherein at least one L of the transition metal complex is a hydrocarbyl.

69. The catalyst of claim 66 wherein Z is Ni, Pd, Fe or Co.

70. The catalyst composition of claim 64 wherein Z is Ni or Pd and each L is independently a chlorine, bromine, iodine or a $C_1$-$C_8$ alkyl group.

71. The catalyst composition of claim 65 wherein Z is iron or cobalt and each L is independently a chlorine, bromine, iodine or a $C_1$-$C_8$ alkyl group.

72. The catalyst composition of claim 63 wherein "a" of the aluminum compound is 3.

73. The catalyst composition of claim 64 wherein "a" of the aluminum compound is 3.

74. The catalyst composition of claim 65 wherein "a" of the aluminum compound is 3.

75. The catalyst composition of claim 66 wherein "a" of the aluminum compound is 3.

76. The catalyst composition of claim 63 wherein the transition metal is Fe.

77. The catalyst composition of claim 64 wherein the transition metal is Fe.

78. The catalyst composition of claim 65 wherein the transition metal is Fe.

79. The catalyst composition of claim 72, 73 or 74 wherein the transition metal is Fe.

80. The catalyst composition of claim 63 wherein the inorganic oxide has a total volatile content of 0.1 to about 4 weight percent, surface hydroxyl groups of from 0.1 to 5 mmol/g and a surface area of from 10 to 1000 m²/g.

81. The catalyst composition of claim 72 wherein the inorganic oxide has a total volatile content of 0.1 to about 4 weight percent, surface hydroxyl groups of from 0.1 to 5 mmol/g and a surface area of from 10 to 1000 m²/g.

82. The catalyst composition of claim 73 wherein the inorganic oxide has a total volatile content of 0.1 to about 4 weight percent, surface hydroxyl groups of from 0.1 to 5 mmol/g and a surface area of from 10 to 1000 m²/g.

83. The catalyst composition of claim 74 wherein the inorganic oxide has a total volatile content of 0.1 to about 4 weight percent, surface hydroxyl groups of from 0.1 to 5 mmol/g and a surface area of from 10 to 1000 m²/g.

84. The catalyst composition of claim 75 wherein the inorganic oxide has a total volatile content of 0.1 to about 4 weight percent, surface hydroxyl groups of from 0.1 to 5 mmol/g and a surface area of from 10 to 1000 m²/g.

85. The catalyst composition of claim 76 wherein the inorganic oxide has a total volatile content of 0.1 to about 4 weight percent, surface hydroxyl groups of from 0.1 to 5 mmol/g and a surface area of from 10 to 1000 m²/g.

86. The catalyst composition of claim 77 wherein the inorganic oxide has a total volatile content of 0.1 to about 4 weight percent, surface hydroxyl groups of from 0.1 to 5 mmol/g and a surface area of from 10 to 1000 m²/g.

87. The catalyst composition of claim 78 wherein the inorganic oxide has a total volatile content of 0.1 to about 4 weight percent, surface hydroxyl groups of from 0.1 to 5 mmol/g and a surface area of from 10 to 1000 m²/g.

88. The catalyst composition of claim 79 wherein the inorganic oxide has a total volatile content of 0.1 to about 4 weight percent, surface hydroxyl groups of from 0.1 to 5 mmol/g and a surface area of from 10 to 1000 m²/g.

89. The catalyst composition of claim 63, 72, 73, 74 or 80 wherein the inorganic oxide is silica and the transition metal is Fe.

90. The catalyst composition of claim 63, 72, 80 wherein said aluminum compound is present in an amount to provide from about 0.01 to 1.9 mmol of Al per gram of inorganic oxide; said transition metal complex is present in an amount to provide from 5 to 500 moles of transition metal per gram of inorganic oxide and said aluminum to transition metal is in a molar ratio of 1:1 to 20:1.

91. The catalyst composition of claim 89 wherein said aluminum compound is present in an amount to provide from about 0.01 to 1.9 mmol of Al per gram of inorganic oxide; said transition metal complex is present in an amount to provide from 5 to 500 moles of transition metal per gram of inorganic oxide and said aluminum to transition metal is in a molar ratio of 1:1 to 20:1.

92. A process for forming a heterogeneous catalyst useful in the polymerization of olefins comprising contacting substantially simultaneously in a single reaction zone having an inert liquid, the components comprising:
- a) aluminum compounds selected from at least one aluminum compound represented by the formula

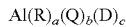

wherein
    R is a hydrocarbyl group;
    Q is a hydrocarbyloxy group;
    D is hydrogen or halogen; and
    each a, b, c is an integer of 0-3 provided the sum of a+b+c is 3;
- b) an inorganic oxide having from 0.01 to 12 mmole/gram of surface hydroxyl groups; and
- c) a precatalyst selected from at least one transition metal compounds selected from the group consisting of a bidentate ligand/transition metal complex, tridentate ligand/transition metal complex and mixtures thereof and wherein said transition metal is selected from the group consisting of Fe, Co, Ni, Ru, Rh, Pd, Os, Ir, Pt, Ti, Zr and Hf; said components being present in amounts to provide 0.001 to 2.1 mmol of aluminum and from 1 to 1000 μmol of transition metal per gram of inorganic oxide and a mole ratio of aluminum to transition metal of from 1:1 to 25:1.

93. The process of claim 92 wherein the components a), b) and c) are concurrently introduced into the inert liquid and maintained therein at a temperature of from 0° to 50° C. and atmospheric pressure.

94. The process of claim 92 or 93 wherein the transition metal is Fe.

95. The process of claim 92 or 93 wherein the inorganic oxide is silica.

96. The process of claim 95 wherein the transition metal is Fe.

97. The process of claim 96 wherein "a" of the aluminum compound is 3.

98. The process of claim 92 wherein the components are introduced into the inert liquid in the order of first component a), followed by component b), and then followed by component c) and recovering a solid mixture from the liquid.

* * * * *